United States Patent [19]
Takizawa

[11] Patent Number: 5,894,300
[45] Date of Patent: Apr. 13, 1999

[54] COLOR IMAGE DISPLAY APPARATUS AND METHOD THEREFOR

[75] Inventor: Tetsuro Takizawa, Tokyo, Japan

[73] Assignee: NEC Corporation, Tokyo, Japan

[21] Appl. No.: 08/709,911

[22] Filed: Sep. 9, 1996

[30] Foreign Application Priority Data

Sep. 28, 1995 [JP] Japan .................. 7-274682

[51] Int. Cl.$^6$ .................................................. G06T 1/60
[52] U.S. Cl. .................. 345/115; 345/114; 345/150; 345/153; 345/154; 345/155; 345/202
[58] Field of Search .................. 345/114, 115, 345/150, 153, 154, 155, 186, 199, 202, 302, 510, 512, 514, 516, 517; 382/236; 348/417, 418, 422

[56] References Cited

U.S. PATENT DOCUMENTS

| | | | |
|---|---|---|---|
| 4,712,099 | 12/1987 | Maeda | 345/199 |
| 5,124,688 | 6/1992 | Rumball | 345/199 |
| 5,243,447 | 9/1993 | Bodenkamp et al. | |
| 5,250,928 | 10/1993 | Kuriki | 345/153 |
| 5,250,933 | 10/1993 | Beaudin et al. | |
| 5,257,113 | 10/1993 | Chen et al. | 358/426 |
| 5,274,753 | 12/1993 | Roskowski et al. | 345/116 |
| 5,351,133 | 9/1994 | Blonstein | 358/426 |
| 5,475,400 | 12/1995 | Sellers et al. | 345/155 |
| 5,604,514 | 2/1997 | Hancock. | |
| 5,784,050 | 7/1998 | Corry | 345/164 |

FOREIGN PATENT DOCUMENTS

| | | |
|---|---|---|
| 0 445 388 | 9/1991 | European Pat. Off. . |
| 63-30081 | 2/1988 | Japan . |
| 63-193177 | 8/1988 | Japan . |
| 1-114181 | 5/1989 | Japan . |
| 1267782 | 10/1989 | Japan . |
| 3-194593 | 8/1991 | Japan . |
| 7-210134 | 11/1995 | Japan . |

OTHER PUBLICATIONS

European Search Report dated Sep. 26, 1997.
A. C. Barkans; "HP Color Recovery Technology"; Hewlett–Packard Journal, Apr. 1995, pp. 51–59.

*Primary Examiner*—Mark K. Zimmerman
*Assistant Examiner*—Vincent E. Kovalick
*Attorney, Agent, or Firm*—McGinn & Gibb, P.C.

[57] ABSTRACT

A single frame buffer is used in displaying on a display both an image from a first-type image source specified by a red-green-blue (RGB) value and an image from a second-type image source specified by an index value for a look-up table. A data-type buffer stores a data-type indicating whether each value stored in the frame buffer is the RGB value or the index value corresponding to each pixel on the display. A buffer writer may compress the RGB value. A buffer reader may decompress the RGB value from the compressed RGB value.

10 Claims, 12 Drawing Sheets

| INDEX | R | G | B |
|---|---|---|---|
| 000000000000 | 00000000 | 00000000 | 00000000 |
| 000000000001 | 00000000 | 00001111 | 11111111 |
| ⋮ | ⋮ | ⋮ | ⋮ |
| 111111111111 | 11111111 | 11111111 | 11111111 |

| CODE | DIFFERENCE (REAL) | DIFFERENCE (EXTRACTED) |
|---|---|---|
| 0000 | 0 ~ 1 | 1 |
| 0001 | 2 ~ 3 | 3 |
| 0010 | 4 ~ 7 | 6 |
| 0011 | 8 ~ 15 | 12 |
| 0100 | 16 ~ 31 | 24 |
| 0101 | 32 ~ 63 | 48 |
| 0110 | 64 ~ 127 | 96 |
| 0111 | 128 ~ 255 | 192 |
| 1000 | −1 | −1 |
| 1001 | −2 ~ −3 | −3 |
| 1010 | −4 ~ −7 | −6 |
| 1011 | −8 ~ −15 | −12 |
| 1100 | −16 ~ −31 | −24 |
| 1101 | −32 ~ −63 | −48 |
| 1110 | −64 ~ −127 | −96 |
| 1111 | −128 ~ −255 | −192 |

FIG.12

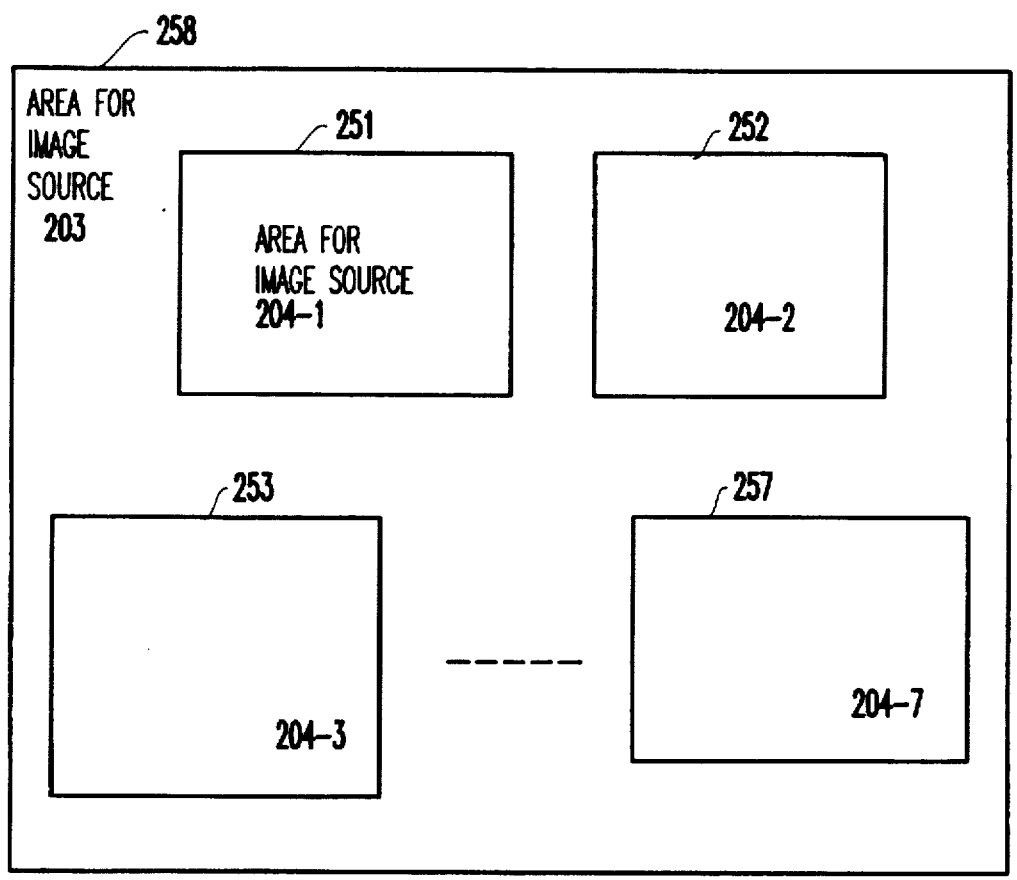

COLOR IMAGE DISPLAY APPARATUS AND METHOD THEREFOR

BACKGROUND OF THE INVENTION

The present invention is related to a color image display apparatus having a frame buffer and a look-up table (LUT), and more particularly to a color image display apparatus in which a single frame buffer is used to display a plurality of types of image data, for example, image data for which a pixel value is specified by an index value of the look-up table, and image data for which it is specified by an RGB (red, green, and blue) value.

In a conventional color image display apparatus, a frame buffer is provided for holding the pixel value of each pixel on a color bit-mapped display screen. Image data are stored once in the frame buffer, and then periodically read out to generate a video signal. The conventional color image display apparatuses are classified into one of two categories depending on the form of the pixel values held in the frame buffer.

A first type of color image display apparatus is one which holds RGR values as the pixel values in the frame buffer. Each of the RGB value has a red value, a green value, and a blue value. A second type of color image display apparatus is one which has a look-up table for holding the RGB values corresponding to each index value and which holds the index values of the look-up table as the pixel values in the frame buffer.

In a computer system having a color image display apparatus, the display area is divided into a plurality of areas, and the images from different image sources are concurrently displayed on the respective display areas. In this case, if all of the image sources specify a pixel value by an RGB value, then a color image display apparatus requires the frame buffer for holding the RGB value. In contrast, if all of the image sources specify a pixel value by an index value of a look-up table, then a color image display apparatus requires the frame buffer for holding the index value.

However, multi-media technology has increased the variety of image sources existing in the same system, and there are both image sources for which a pixel value is specified by an RGB value, and image sources for which a pixel value is specified by an index value of a look-up table.

Under such circumstances, in the color image display apparatus of the type holding an RGB value in the frame buffer, images for which a pixel value is specified by an index value cannot be displayed. Similarly, in the color image display apparatus of the type holding an index value in the frame buffer, images for which a pixel value is specified by an RGB value cannot be displayed.

If two frame buffers are provided so as to combine their outputs, the required frame buffer capacity is doubled. If the specifications of a plurality of image sources are changed to unify their outputs to one of an RGB value and an index value, a substantial specification change of the image sources is required.

SUMMARY OF THE INVENTION

In view of the foregoing problem of the conventional system, an object of the present invention is to provide a color image display apparatus in which a single frame buffer can be used to display a plurality of types of image data. For example, a single frame buffer is used for displaying image data for which a pixel value is specified by an index value of a look-up table, and image data for which a pixel value is specified by an RGB value.

In a color image display apparatus according to a first aspect of the present invention, a display having pixels displays color images on the pixels. A first image source outputs a first pixel value for the display. A look-up table stores a second pixel value for the display. A second image source outputs an index value to index the look-up table. A frame buffer stores both the first pixel value and the index value corresponding to each pixel on the display. A data-type buffer stores a data-type indicating whether each value stored in the frame buffer is the first pixel value or the index value corresponding to each of the pixels on the display. A buffer writer writes one of the first pixel value from the first image source and the index value from the second image source to each of the pixels of the frame buffer. A buffer reader reads a value stored in the frame buffer for each of the pixels, and outputs one of the first pixel value stored in the frame buffer and the second pixel value stored in the look-up table according to the data-type of the pixel in the data-type buffer.

With the unique and unobvious structure of the present invention, pixels from different types of image sources can be displayed simultaneously on the color display apparatus with a single frame buffer.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 3B illustrates an example of the logical construction of a data-type storing area 161 in the first embodiment;

FIG. 3C illustrates one example of values of the datatype storing area 161 in the first embodiment;

FIG. 3D illustrates the other example of values of the data-type storing area 161 in the first embodiment;

FIG. 5 illustrates an example of the logical construction of the look-up table 110;

3

Figure 9A:
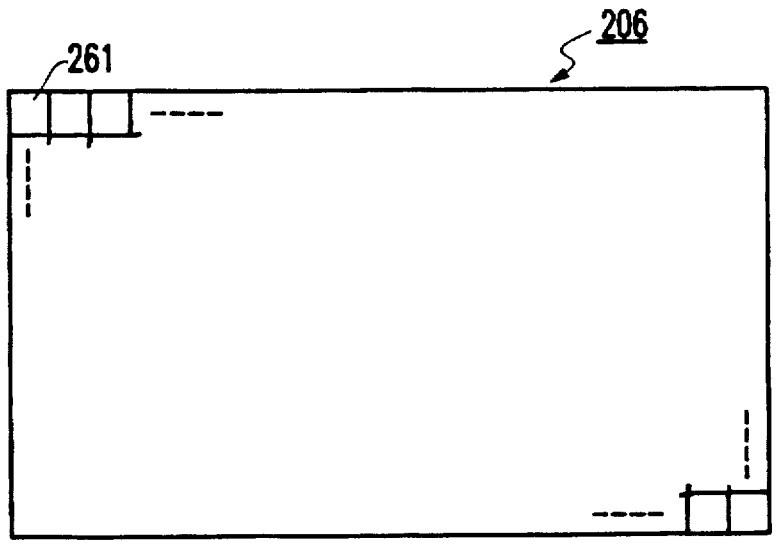
FIG. 9A illustrates an example of the logical construction of a data-type buffer 206 in the second embodiment.
Figure 9B:
FIG. 9B illustrates an example of the logical construction of a data-type storing area 261 in the second embodiment.
Figure 9C:
Figure 9D:
Figure 10A:
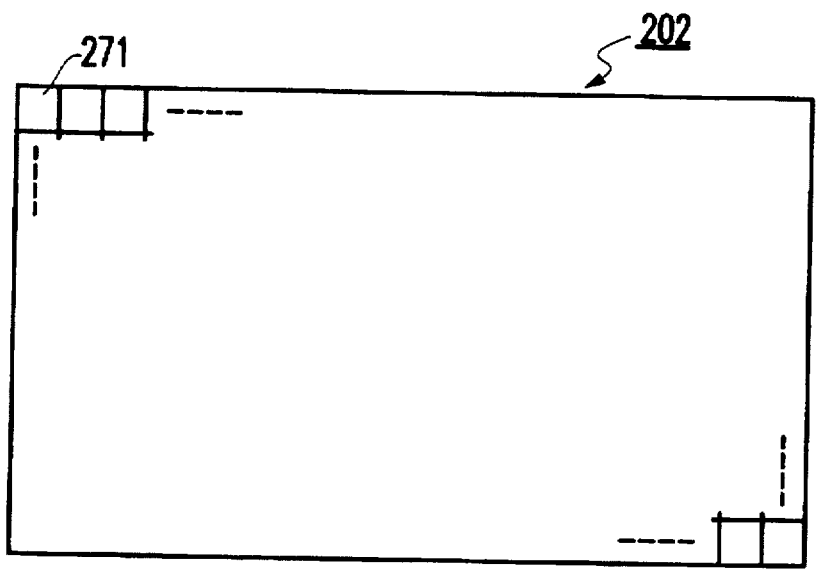
Figure 10B:
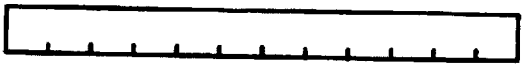
Figure 10C:
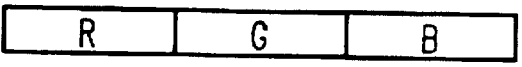
Figure 10D:
Figure 11:
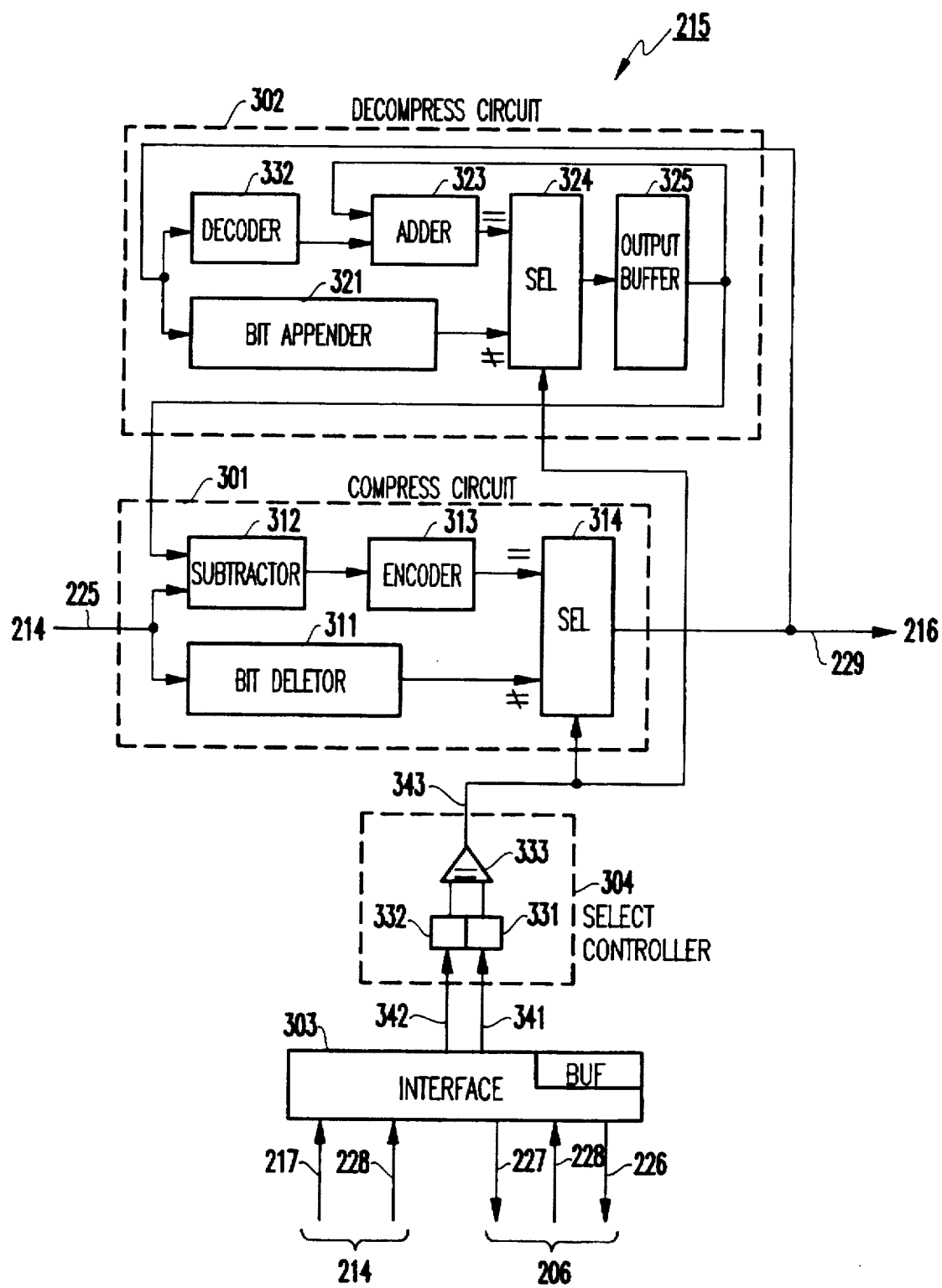
Figure 13:
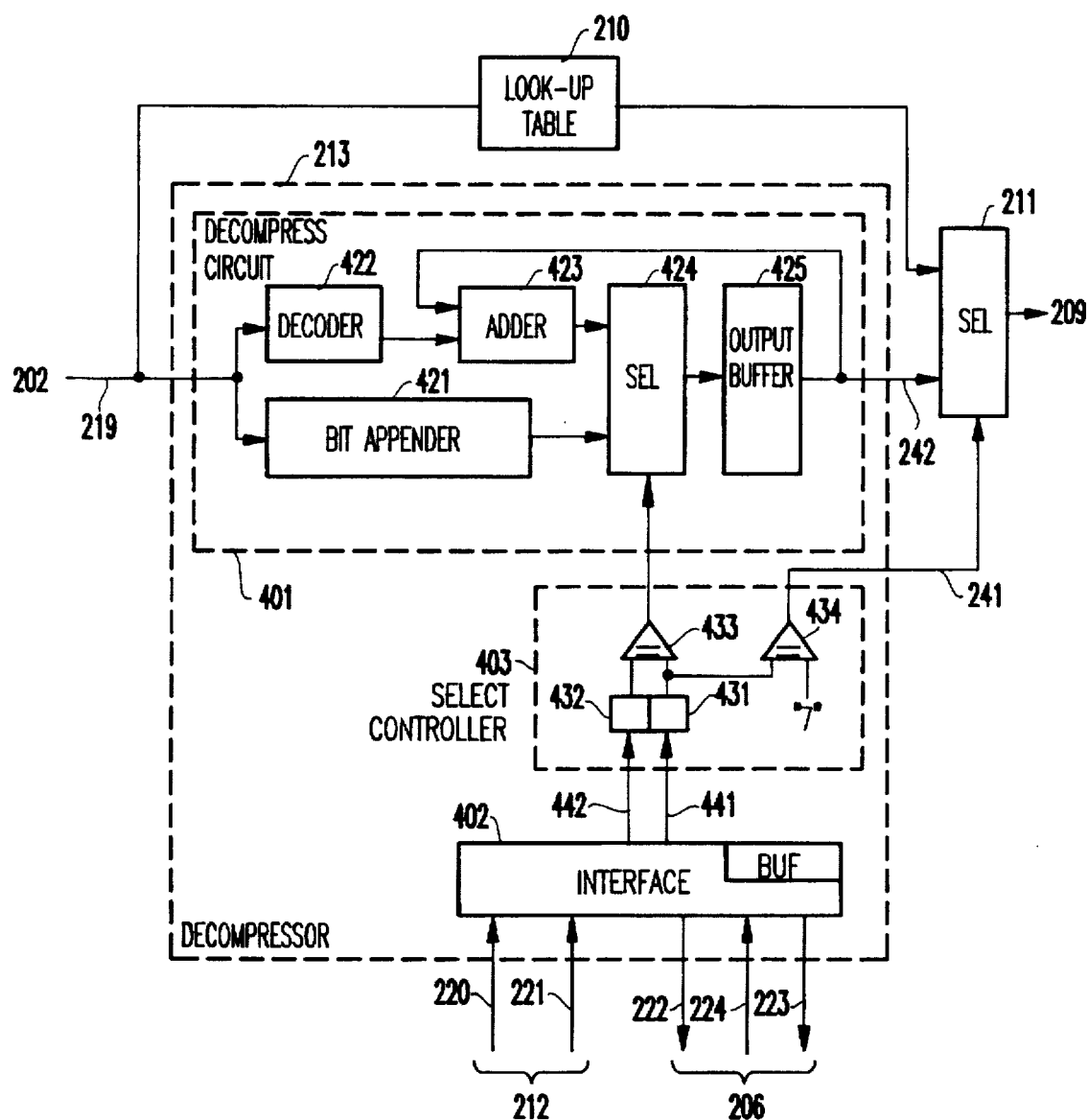
Figure 14:
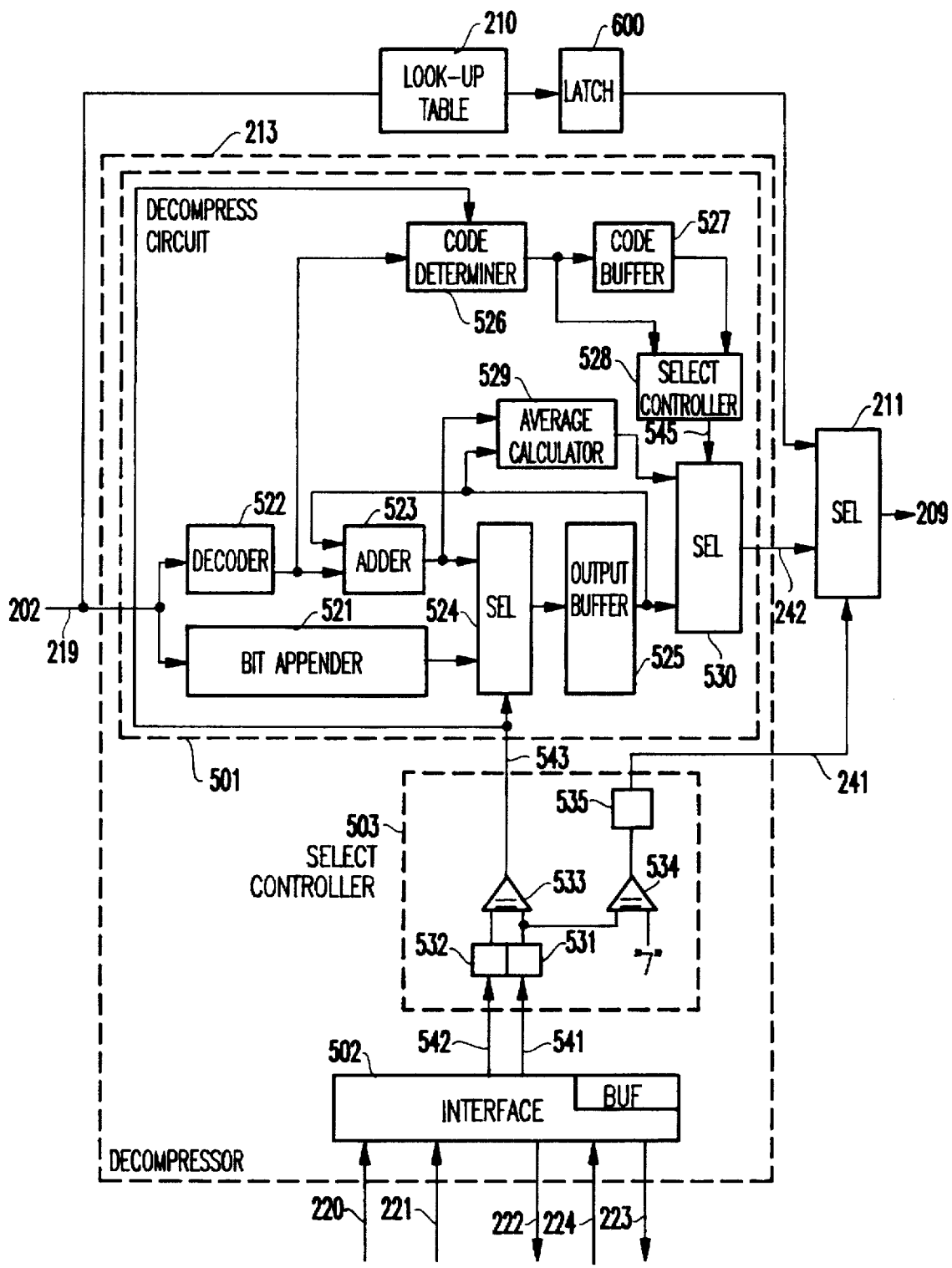
Figure 17:
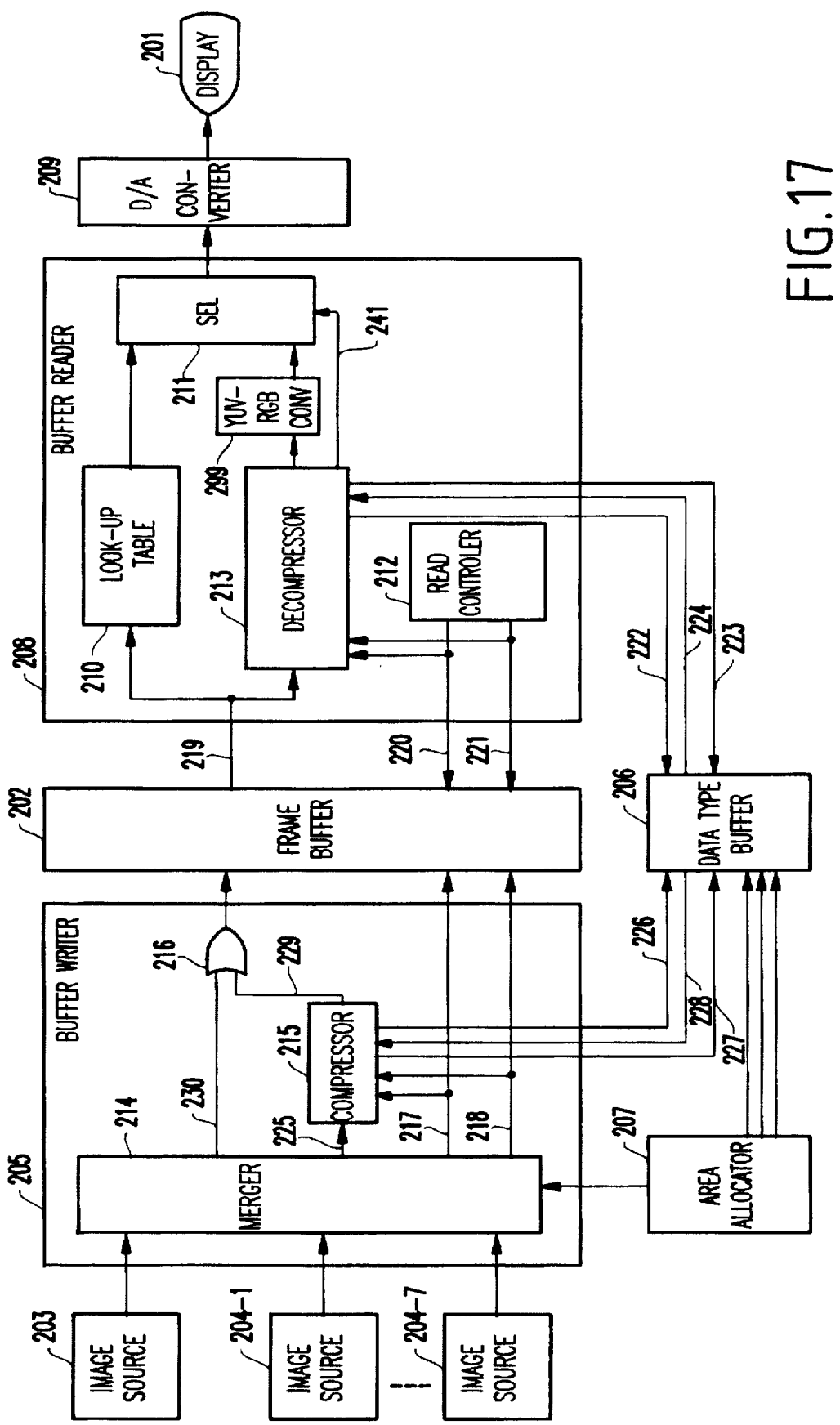

FIG. 9C illustrates one example of values of the data-type storing area 261 in the second embodiment;

FIG. 9D illustrates the other example of values of the data-type storing area 261 in the second embodiment;

FIG. 10A illustrates an example of the logical construction of a frame buffer 202 in the second embodiment;

FIG. 10B illustrates an example of the logical construction of a pixel value storing area 271 in the second embodiment;

FIG. 10C illustrates one example of values of the pixel value storing area 271 in the second embodiment;

FIG. 10D illustrates another example of values of the pixel value storing area 271 in the second embodiment;

FIG. 11 is a block diagram showing an example of the construction of a compressor 215 in the second example;

FIG. 12 illustrates an example of the scheme of encoding and decompression;

FIG. 13 is a block diagram showing an example of the construction of a decompressor 213;

FIG. 14 is a block diagram showing another example of the construction of a decompressor 213;

FIG. 15A illustrates an example of original pixel values;

FIG. 15B illustrates an example of compressed pixel values;

FIG. 15C illustrates an example of decompressed pixel values decompressed by the decompressor 213 in FIG. 13;

FIG. 15D illustrates an example of decompressed pixel values decompressed by the decompressor 213 in FIG. 14;

FIG. 16 illustrates another allocation of the display areas for respective image sources in the second embodiment; and FIG. 17 is a block diagram showing the configuration of a variation of the second embodiment of the present invention.

DETAILED DESCRIPTION OF THE PREFERRED EMBODIMENTS

A color image display apparatus in accordance with preferred embodiments of the present invention will be described in detail with reference to the accompanying drawings.

Figure 1:
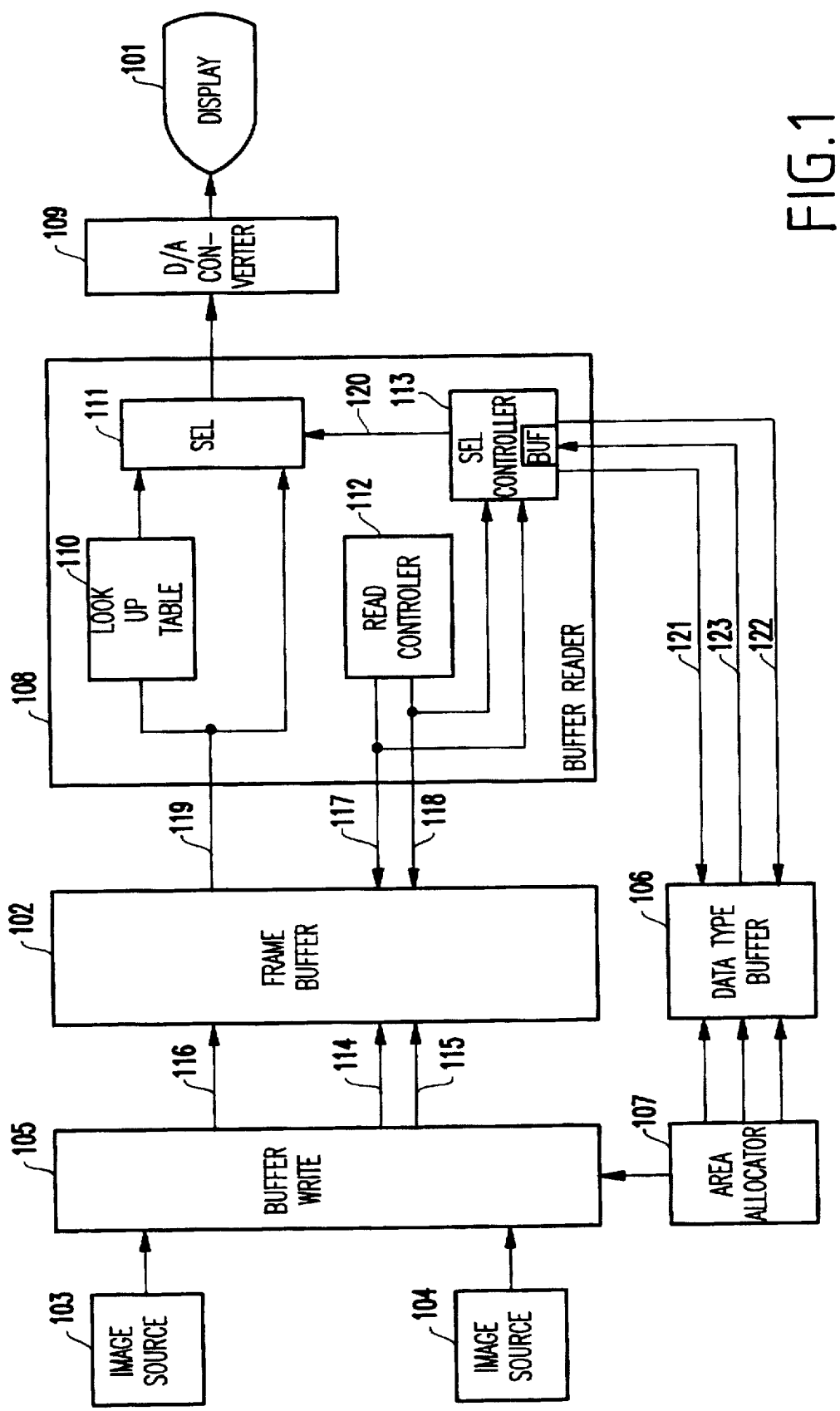
FIG. 1 is a block diagram showing the configuration of a color image display apparatus according to a first embodiment of the present invention.

Referring to FIG. 1, the color image display apparatus of a first embodiment of the present invention has a display 101, a single frame buffer 102, a first-type image source 103, a second-type image source 104, a buffer writer 105, a data-type buffer 106, an area allocator 107, a buffer reader 108, and a digital-to-analog (D/A) converter 109. The single frame buffer 102 holds a pixel value of each pixel on the display 101. The first-type image source 103 outputs a pixel value specified by an RGB value. The second-type image source 104 outputs a pixel value specified by an index value of the look-up table 110. The buffer writer 105 writes the pixel values outputted from the image sources 103 and 104 to the frame buffer 102. The data-type buffer 106 holds for each pixel a data-type value indicating whether each pixel value in the frame buffer 102 is one of an RGB value and an index value.

The area allocator 107 divides the display 101 into a plurality of display areas (e.g., allocating a first portion of the display areas to the first-type image source 103 and allocating a remaining portion of the display areas to the second-type image source 104), and informs the buffer writer 105 of an allocation status. Thus, pixel values from the first-type image source 103 are written into the first portion of the display areas and pixel values from the

4 second-type image source 104 are written into the remaining portion of the display areas.

The allocation status includes correspondence between each pixel on the display and the image sources 103 and 104. The area allocator 107 sets a data-type value corresponding to the allocation status in the data-type buffer 106. The buffer reader 108 sequentially reads the pixel value of each pixel from the frame buffer 102, and determines the type of the read pixel value according to the data-type value of the pixel in the data-type buffer 106. The buffer reader 108 directly outputs the read pixel value if it is an RGB value, and outputs the read pixel value after conversion to an RGB value by the look-up table 110 if it is an index value. The D/A converter 109 performs the digital-to-analog conversion of the output of the frame buffer 108 to generate and output a video signal to the display 101.

The buffer reader 108 has a look-up table (LUT) 110, a selector 111, a read controller 112, and a selector controller 113. The look-up table 110 holds an RGB value for each index value, and uses the pixel value 119 read-out from the frame buffer 102 as an index value to output the RGB value which it is holding corresponding to the index value.

The selector 111 selects one of the pixel value 119 outputted from the frame buffer 102 and the RGB value outputted from the look-up table 110 to the D/A converter 109. The read controller 112 sequentially reads the contents of the frame buffer 102 one pixel at a time and cyclically and repetitively. The selector controller 113 determines the type of the pixel value 119 read out by the read controller 112 according to the contents of the data-type buffer 106. The selector controller 113 generates selector control signal 120 thereby to switch the selector 111 to the frame buffer 102 if it is an RGB value, and to switch the selector 111 to the look-up table 110 if it is an index value.

Figure 2:
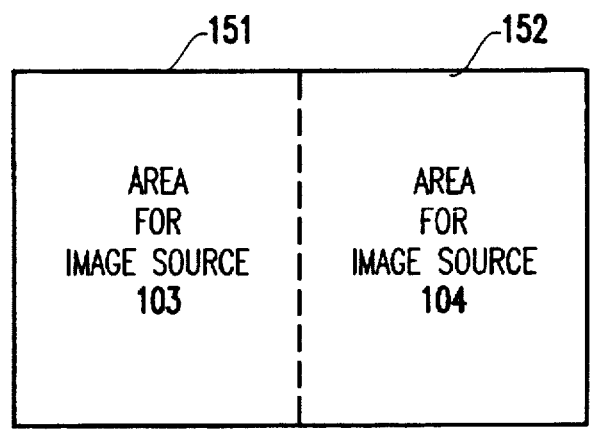
FIG. 2 illustrates an allocation of the display areas for respective image sources in the first embodiment.

Referring to FIG. 2, the display area is divided into two areas of the display 101 (e.g., left and right). One display area 151 is allocated to the display of the image source 103 and the other display area 152 is allocated to the display of the image source 104.

Figure 3A:
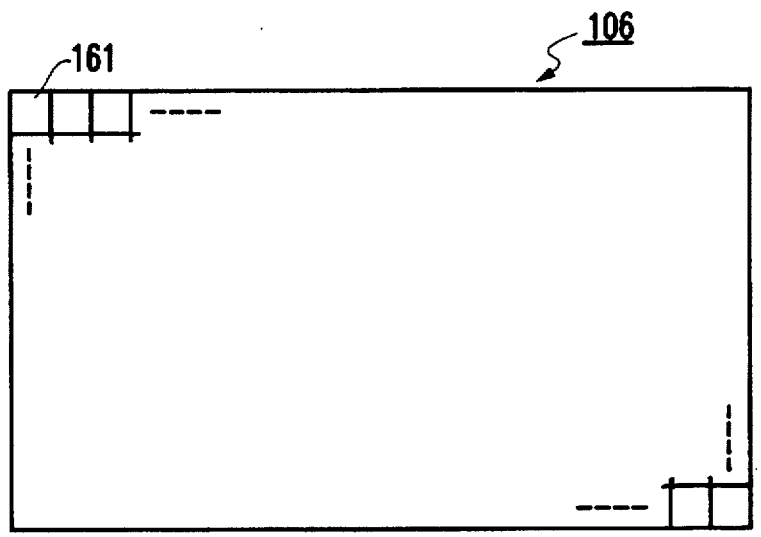
FIG. 3A illustrates an example of the logical construction of a data-type buffer 106 in the first embodiment.

Referring to FIG. 3A, the data-type buffer 106 has data-type store areas 161 corresponding to each pixel of the display 101. Each data-type store area 161 has a capacity of one bit in this embodiment, as shown in FIG. 3B. Of course, as known by one of ordinary skill in the art taking the present specification as a whole, the store areas 161 may have other capacities according to the designer's requirements. A first value (e.g., "0") is set if the pixel value of the pixel corresponding to the particular data-type store area 161 is specified by an RGB value (that is, it belongs to the display area 151 for the image source 103), as shown in FIG. 3C, while a second value (e.g., "1") is set if specified by an index value (that is, it belongs to the display area 152 for the image source 104), as shown in FIG. 3D.

Referring to FIG. 4, the frame buffer 102 has pixel value store areas 171 which correspond to each pixel of the display. For example, each pixel value store area 171 has a capacity of 24 bits in this embodiment, as shown in FIG. 4B. If an RGB value is stored as a pixel value, the R value is stored in the upper 8 bits, the G value in the middle 8 bits, and the B value in the lower 8 bits, as shown in FIG. 4C. If an index value of the look-up table 110 is stored as a pixel value, the upper 12 bits are not used, and the index value of the look-up table 110 is stored in the lower 12 bits, as shown in FIG. 4D.

Referring to FIG. 5, the look-up table 110 is indexed by an index expressed by 12 bits. The look-up table 110 holds an RGB value of 24 bits, which is made up of an R value, a G value, and a B value each including 8 bits.

Hereinbelow and referring to FIGS. 1–5, the operation of the color image display apparatus in accordance with the first embodiment of the present invention will be described.

If the display areas 151 and 152 shown in FIG. 2 are allocated to the image sources 103 and 104, respectively, the area allocator 107 notifies the buffer writer 105 of the allocation status, and sets a value of "0" in all of the data-type store areas 161 in the data-type buffer 106 which correspond to the display area 151, and sets a value "1" in all of the data-type store areas 161 which correspond to the display area 152.

The image source 103 includes a digital video camera, and outputs each pixel value expressed by an RGB value. That is, as shown in the conventional video signal, it continuously outputs each pixel value horizontally from the pixel at the upper-left end of an image, when the right end of each line is reached, it again continuously horizontally outputs from the left end of the line. On the other hand, the image source 104 includes graphics software running on a computer, and outputs each pixel value expressed by an index value of the look-up table 110.

Figure 4A:
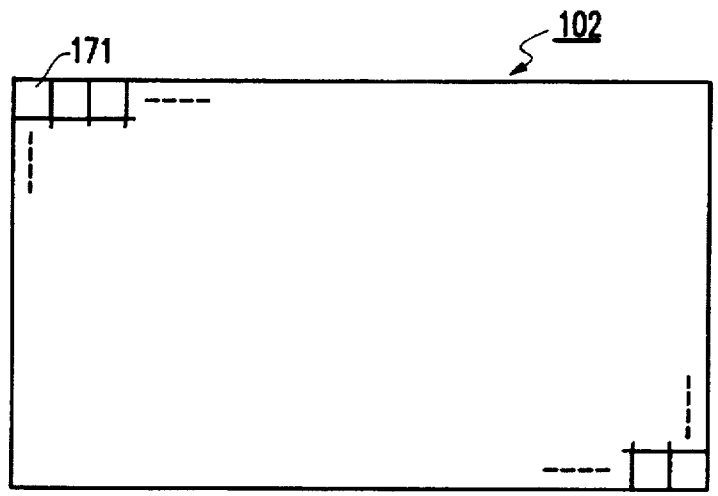
FIG. 4A illustrates an example of the logical construction of a frame buffer 102 in the first embodiment.
Figure 4B:
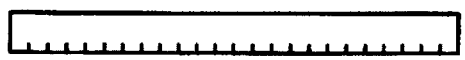
FIG. 4B illustrates an example of the logical construction of a pixel value storing area 171 in the first embodiment.
Figure 4C:
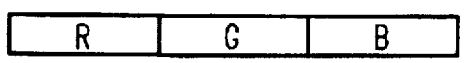
FIG. 4C illustrates one example of values of the pixel value storing area 171 in the first embodiment.
Figure 4D:
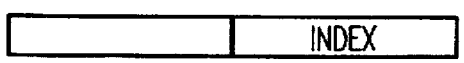
FIG. 4D illustrates the other example of values of the pixel value storing area 171 in the first embodiment.

The buffer writer 105 outputs a write address 114, a write signal 115, and a write pixel value 116 to the frame buffer 102, thereby to store the pixel value of each pixel outputted from the image source 103 ("RGB value", in this case) in the corresponding pixel value store area 171 in the frame buffer 102 in the format shown in FIG. 4C, and to store the pixel value of each pixel outputted from the image source 104 ("index value", in this case) in the corresponding pixel value store area 171 in the frame buffer 102 in the format shown in FIG. 4D.

Simultaneously with the write operation of the frame buffer 102 described above, the read controller 112 of the buffer reader 108 performs the read-out of the frame buffer 102. In the reading-out of the frame buffer 102, a read address signal 117 and a read signal 118 are output to the frame buffer 102 to cyclically repeat an operation. The reading is continuously horizontally performed from the pixel value store area 171 corresponding to the pixel at the upper-left end of the display. When the pixel value store area 171 corresponding to the pixel at the right end of each line is reached, the reading is again continuously horizontally performed from the pixel value store area 171 corresponding to the pixel at the left end of the next line. Each read pixel value 119 of the pixel value store area 171 is inputted to the look-up table 110 and a first input of the selector 111.

The look-up table 110 uses the lower 12 bits of the inputted pixel value 119 as an index value to output the RGB value held corresponding to the index value to a second input of the selector 111.

The selector controller 113 provides a read address 121 and a read signal 122 to the data-type buffer 106, the output data 123 of which is inputted to the selector controller 113, thereby to read the contents of each data-type value store area 161 in the data-type buffer 106 shown in FIG. 3 into an internal buffer (unreferenced). When a read address 117 and a read signal 118 are outputted from the read controller 112, the selector controller 113 outputs the data-type value ("1" or "0") in the data-type store area 161 corresponding to the pixel of the currently-read pixel value 119 to the selector 111 as a selector control signal 120 according to the read address 117.

The selector 111 selects the pixel value 119 outputted from the frame buffer 102 and outputs it to the D/A converter 109 when the selector control signal 120 is "0". The selector 111 selects the output of the look-up table 110 and outputs it to the D/A converter 109 when the selector control signal 120 is "1".

As a result, if an RGB value which is a pixel value of the image source 103 is read out from the frame buffer 102, it is directly outputted to the D/A converter 109 through the selector 111. If an index value which is a pixel value of the image source 104 is read-out, the RGB value converted in the look-up table 110 is outputted to the D/A converter 109.

Figure 6:
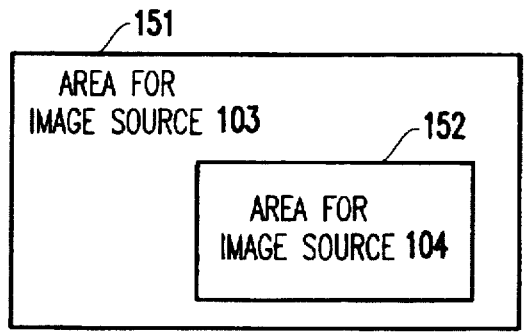
FIG. 6 illustrates another allocation of the display areas for respective image sources in the first embodiment.

Although, in FIG. 1, the number of the image sources 103 and 104 of the first and second types is one, respectively, the present invention is equally applicable to when two or more respective image sources exist. Further, the allocation of display areas to the image sources 103 and 104 is not limited to the example in FIG. 2, but the allocation may be performed, for instance, as in FIG. 6.

Moreover, in FIG. 1, the first-type image source 103 has been assumed to specify a pixel value by an RGB value. However, the present invention can also be applied to a system in which a pixel value is specified by a "YUV" value rather than an RGB value. The YUV value has a Y value for representing luminance (commonly termed "brightness"), and U and V values for representing color-differences. In this case, a YUV-RGB converter is added to the buffer reader 108 in FIG. 1, for converting the YUV value from the frame buffer 102 to an RGB value.

Next, a second embodiment of the present invention will be described in detail with reference to FIG. 7.

Figure 7:
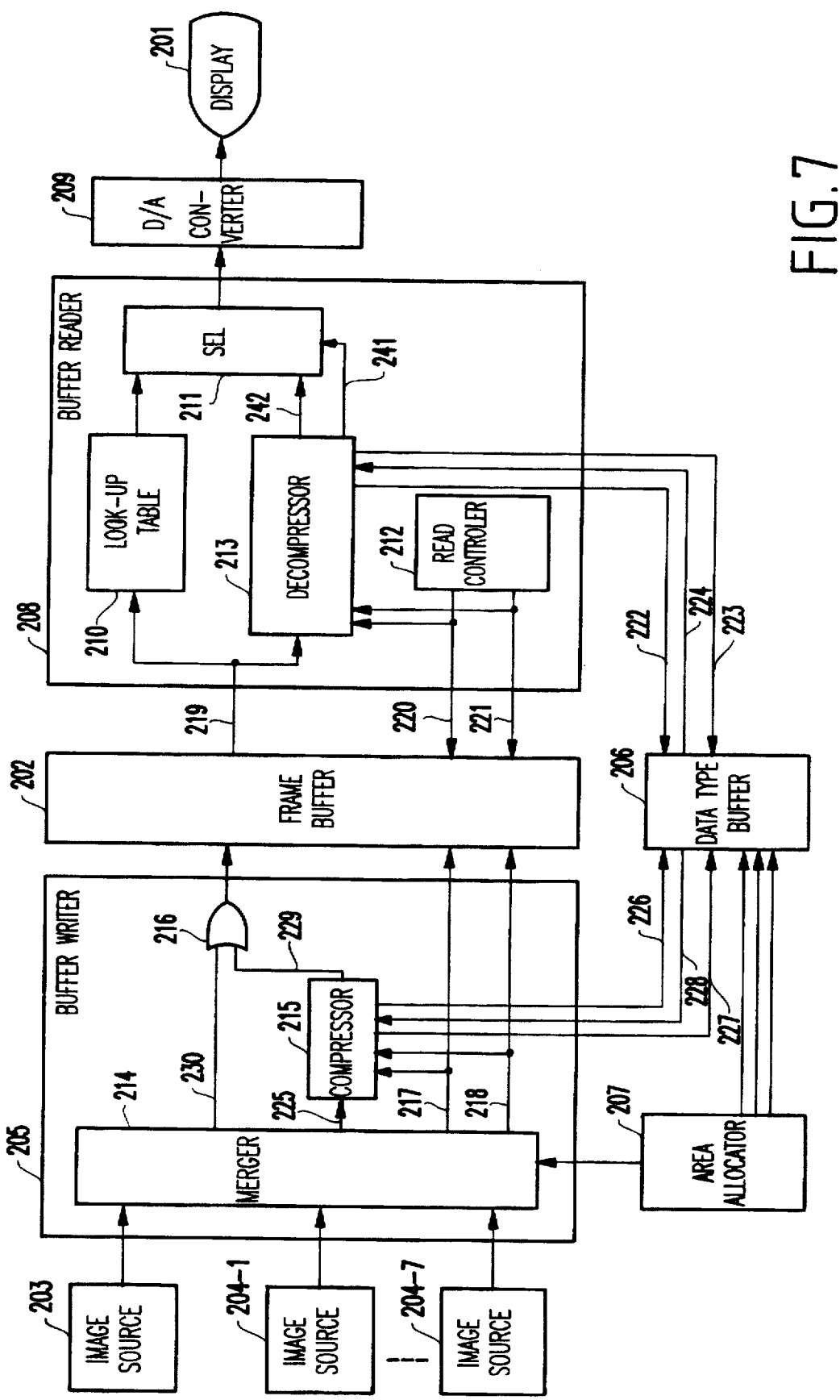
FIG. 7 is a block diagram showing the configuration of a color image display apparatus according to a second embodiment of the present invention.

Referring to FIG. 7, the color image display apparatus of the second embodiment has a display 201, a frame buffer 202, a first-type image source 203, a plurality of second-type image sources 204-1 to 204-7, a buffer writer 205, a data-type buffer 206, an area allocator 207, a buffer reader 208, and a D/A converter 209.

The frame buffer 202 holds the pixel value of each pixel of the display 201. The first-type image source 204 outputs a pixel value specified by an index value of the look-up table 210. The plurality of second-type image sources 204-1 to 204-7 output pixel values specified by RGB values. The buffer writer 205 writes the pixel values outputted from the image sources 204-1 to 204-7 and 203 to the frame buffer 202. The pixel values from the image sources 204-1 to 204-7 are compressed in the buffer writer 205.

The data-type buffer 206 holds for each pixel a data-type value which indicates to which of the display areas allocated to the image sources the pixel represented by each pixel value stored in the frame buffer 202 belongs. The area allocator 207 divides the display 201 into a plurality of display areas. The area allocator 207 informs the buffer writer 205 of the allocation status and sets a data-type value corresponding to the allocation status in the data-type buffer 206.

The buffer reader 208 sequentially reads the pixel value of each pixel from the frame buffer 202. The buffer reader 208 determines to which image source each respective read pixel value belongs according to the data-type value of the pixel in the data-type buffer 206. The buffer reader 208 also decompresses the read pixel value if it is from image sources 204-1 to 204-7, and converts it to an RGB value by the look-up table 210 before outputting if it is from the image source 203. The D/A converter 209 performs the digital-to-analog conversion of the output of the buffer reader 208, to output a video signal to the display 201.

The buffer writer has a compressor 215, an OR gate 216, and a merger 214. The compressor 215 "compresses" an RGB value. The OR gate 216 performs a logical OR operation between the outputs of the compressor 215 and the merger 214. The merger 214 outputs the pixel values from the image sources 204-1 to 204-7 to the compressor 215, and outputs the pixel values from the image source 203 to the OR gate 216. The merger 214 provides a write address 217 and a write signal 218 to the frame buffer 202 to perform the write control of the pixel value.

The buffer reader 208 has a look-up table 210, a decompressor 213, a selector 211, and a read controller 212. The look-up table 210 holds an RGB value indexed by the pixel value 219 read out from the frame buffer 202. The decompressor 213 decompresses the pixel value 219 read-out from the frame buffer 202. The selector 211 selects one of the outputs of the look-up table 210 and the decompressor 213. The read controller 212 sequentially and repetitively reads the contents of the frame buffer 202. The selector control signal 241 of the selector 211 is generated by the decompressor 213.

Figure 8:
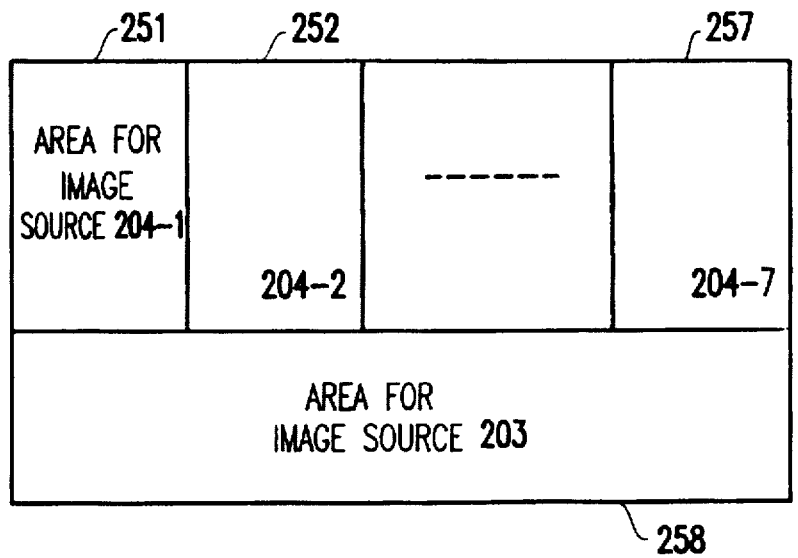
FIG. 8 illustrates an allocation of the display areas for respective image sources in the second embodiment.

Referring to FIG. 8, the display is divided into 8 display areas 251 to 258, and the display areas 251 to 257 are allocated to the display of the image sources 204-1 to 204-7, while the display area 258 is allocated to the display of the image source 203.

Referring to FIG. 9A, the data-type buffer 206 has data-type store areas 261 which correspond to each pixel on the display. Each data-type store area 261 has a capacity of 3 bits in this embodiment, as shown in FIG. 9B. Of course, the store areas 261 may have a greater or lesser capacity according to the designer's requirements. Each data-type store area 261 holds a data-type value indicating to which of the display areas for the image sources 204-1 to 204-7 and 203 the pixel corresponding to the data-type value store area 261 belongs. In this example, if the pixel belongs to the display areas 251 to 257 for the image source 204-1 to 204-7, a value "0" ("000" in binary) to "6" ("110" in binary) is set as shown in FIG. 9C. If the pixel belongs to the display area 258 for the image source 203, a value "7" ("111" in binary) is set as shown in FIG. 9D.

Referring to FIG. 10A, the frame buffer 202 has pixel value store areas 271 which correspond to each pixel of the display. In this embodiment, each pixel value store area 271 has a capacity of 12 bits as shown in FIG. 10B.

If the compressed value of an RGB value is stored as a pixel value, the compressed value of the R value is stored in the upper 4 bits, the compressed value of the G value is stored in the middle 4 bits, and the compressed value of the B value is stored in the lower 4 bits, as shown in FIG. 10C. Further, if an index value of the look-up table 210 is stored as a pixel value, a 12-bit index value of the look-up table 210 is stored as shown in FIG. 10D.

The logical construction of the look-up table 210 is the same as that in FIG. 5, and for each index value expressed by 12 bits, a 24-bit RGB value have an R value, a G value, and a B value each made up of 8 bits.

Hereinbelow and referring to FIGS. 7–10, the operation of the color image display apparatus in accordance with the second embodiment of the present invention will be described.

If the display areas 251 to 258 shown in FIG. 8 are allocated to the image sources 204-1 to 204-7, the area allocator 207 informs the buffer writer 205 of the allocation status, and respectively sets values "0", "1", "2", "3", "4", "5", "6" and "7" in each data-type store area 261 shown in FIG. 9 which corresponds to the display areas 251, 252, 253, 254, 255, 256, 257, and 258 in the data-type buffer 206.

The image sources 204-1 to 204-7 include a digital video camera, and continuously horizontally output each pixel value expressed by a 24-bit RGB value from the typical video signal. When the right end of each line is reached, the image sources again continuously horizontally output each pixel value from the left end of the next line. On the other hand, the image source 204 includes graphics software running on a computer, and outputs each pixel expressed by an index value of the look-up table 210 in a random order.

For the pixel value of each pixel outputted from the image sources 204-1 to 204-7 (RGB value, in this case), the merger 214 of the buffer writer 205 provides the value, compressed in the compressor 215 to 4 bits for each of the R value, G value, and B value, to the frame buffer 202 along with a write address 217 and a write signal 218 through the OR gate 216. Thus, the compressed RGB value is written to the frame buffer 202 corresponding to the display areas 251 to 257 for the respective image sources 204-1 to 204-7 in the format as shown in FIG. 10C.

On the other hand, for the pixel value of each pixel outputted from the image source 203 (index value, in this case), the merger 214 directly writes it to the frame buffer 202 which is corresponding to the display area 258 for the image source 203 through the OR gate 216 in the format as shown in FIG. 10D.

Simultaneously with the write operation of the frame buffer 202 as described above, the read controller 212 of the buffer reader 208 performs the reading of the frame buffer 202. The reading of the frame buffer 202 is performed by repeating for each predetermined cycle an operation in which the read controller 212 outputs a read address 220 and a read signal 221 to the frame buffer 202, to continuously horizontally read from the pixel value store area 271-corresponding to the pixel at the upper left end of the display. When the pixel value store area 271 corresponding to the pixel at the right end of each line is reached, the read controller continuously horizontally reads from the pixel value store area 271 corresponding to the left end of the next line. Each read pixel value 219 of in the pixel value store area 271 in the frame buffer 202 is added to the look-up table 210 and the decompressor 213.

The look-up table 210 uses the inputted pixel value 219 as an index value to output the RGB value held corresponding to the index value to a first input terminal of the selector 211.

On the other hand, the decompressor 213 performs the decompression process of the inputted pixel value 219 to generate an RGB value comprising an R value, a G value, and a B value each of 8 bits, and outputs it to a second input terminal of the selector 211.

Further, the decompressor 213 provides a read address 222 and a read signal 223 to the data-type buffer 206, the output data 224 of which is inputted to the data-type buffer 206 into the internal buffer. When the read address 220 and the read signal 221 to the frame buffer 202 are outputted from the read controller 212, the decompressor 213 determines the contents ("0" to "7") of the data-type store area 261 corresponding to the pixel of the currently read pixel value 219. Thereafter, the decompressor 213 performs a process in which a selector control signal 241 for selecting the look-up table 210 is generated when the value is "7", and a selector control signal 241 for selecting the decompressor 213 is generated when the value is not "7".

As a result, if the compressed RGB value of the image sources 204-1 to 204-7 is read out from the frame buffer 202, the RGB value decompressed from it in the decompressor 213 is outputted to the D/A converter 209 through the selector 211. If an index value which is a pixel value of the image source 203 is read-out, the RGB value converted in the look-up table 210 is outputted to the D/A converter 209.

An example of the configuration of the compressor 215 in the second embodiment is described below.

Referring to FIG. 11, the compressor 215 compresses the beginning pixel in each line of each display area 251 to 257 by deleting the lower bits of each of the R, G, and B values. The compressor 215 compresses the pixels other than the beginning pixel in each line of each display area 251 to 257 by encoding the differential value between each of the R, G, and B values forming the pixel value of the left pixel for each of the R value, G value, and B value. The encoding uses an encoding scheme in which the range of the differential values is segmented more finely (e.g., narrowly) as its absolute value becomes smaller.

As shown in FIG. 11, the compressor 215 has a compress circuit 301, a decompress circuit 302, an interface 303, and a select controller 304. The compress circuit 301 has inputted thereto a write pixel value 225 (e.g., a 24-bit RGB value) from the merger 214 in FIG. 7, and outputs a pixel value 229 obtained by compressing the write pixel value 225 to 12 bits.

The decompress circuit 302 has inputted thereto the pixel value 229 outputted from the compress circuit 301, and decompresses it to a 24-bit pixel value 344. The interface 303 outputs a read address 226 and a read signal 227 to the data-type buffer 206 in FIG. 7, and holds the output data 228 of the data-type buffer 206 in the internal buffer (unreferenced) of the interface 303. Each time a write address 217 and a write signal 218 are outputted from the merger 214 to the frame buffer 202 in FIG. 7, the interface 303 outputs the data-type value 341 of the pixel corresponding to the write address 217 and the data-type value 342 of the left adjacent pixel. The select controller 304 compares the two data-type values 341 and 342 outputted from the interface 303 to output a select control signal 343 according to whether or not there is a match.

The selector control unit 304 has registers 331 and 332 for holding the two data-type values 341 and 342, and a comparator 333 for comparing the two data-type values 341 and 342 held in the registers 331 and 332. The selector control unit 304 outputs the result of the comparison in the comparator 333 as the select control signal 343 to the compressor 301 and the decompression circuit 302.

The compress circuit 301 has a bit deletor 311, a subtractor 312, an encoder unit 313, and a selector 314. The bit deletor 311 deletes the lower 4 bits of each of the R, G, and B values forming a write pixel value 225 and each made up of 8 bits, thereby to generate a 12-bit compressed pixel value whose R value, G value, and B value are made up of 4 bits, respectively. The subtractor 312 calculates the differential value of each of the R, G, and B values between the pixel value 344 of the left pixel decompressed in the decompressor 302 and the write pixel value 225. The encoder unit 313 generates a compressed pixel value made up of three 4-bit codes corresponding to the differential values of the respective R, G, and B values obtained in the subtractor 312. The selector 314 selects one of the compressed pixel value generated in the encoder unit 313 and the compressed pixel value generated in the bit deletor 311, and outputs it as the compressed pixel value 229.

The decompress circuit 302 has a bit appender 321, a decoder 322, an adder 323, a selector 324, and an output buffer 325. The output buffer 325 holds the decompressed pixel value. The bit appender 321 has inputted thereto the compressed pixel value 229 outputted from the compress circuit 301, and appends lower 4 bits having a value of "0" in each of the R, G, and B values (e.g., each having 4 bits) which together form the compressed pixel value 229. Thus, the decompress circuit decompresses a 24-bit pixel value whose R, G, and B values are made up of 8 bits, respectively.

The decoder 322 has inputted thereto the compressed pixel value 229 outputted from the compressor 301, and decompresses the differential values of the respective R, G, and B values from the codes of the R, G, and B value (each having 4 bits) which together form the compressed pixel value 229. The adder 323 adds the differential values of the respective R, G, and B values decompressed in the decoder 322 and the decompressed pixel value held in the output buffer 325, to decompress a 24-bit pixel value. The selector 324 selects one of the pixel value decompressed in the adder 323 and the pixel value decompressed in the bit appender 321 according to the select control signal 343 issued by the select controller 304, and outputs it to the output buffer 325.

Referring to FIG. 12, the encoding scheme (e.g., rule) used for the encoding in the encoder 313 and the code decompression in the decoder 322 is shown. The differential value between two binary numerical values of 8 bits is in the range of −255 to +255, which is divided into 16 segments, and a 4-bit code is allocated to each segment. The differential values as a result of the decompression of the codes are set.

For example, if the differential value of the R value obtained in the subtractor 312 is "5", the differential value of the G value is "20", and the differential value of the B value is "40", then the encoder 313 generates "2" as the code for the R value, "4" as the code for the G value, and "5" as the code for the B value. On the other hand, if the code for the R value of the pixel value "229" generated in the compress circuit 301 is "1", the code for the G value is "3", and the code for the B value is "6", then the decoder 322 generates "3" as the differential value of the R value, "12" as the differential value of the G value, and "96" as the differential value of the B value.

The range of the differential values of −255 to +255 is not equally divided, but it is more finely divided for differential values having smaller absolute values and divided more roughly for differential values having larger absolute values. Specifically, since there is generally a correlation between the adjacent pixels in the same image and the differential value between the adjacent pixels is often a small value, more codes are allocated when the differential value is smaller, thereby to decrease the average error of the compression and decompression in the entire image.

Hereinbelow and referring to FIG. 11, the operation of the compressor 215 in accordance with the second embodiment of the present invention will be described.

The interface 303 previously reads the data-type values in the data-type buffer 206 and stores them in the internal buffer (unreferenced), and the write address 217 and write signal 218 for the pixel value of the first pixel in the beginning line in any of the display areas 251 to 257 of FIG. 8 are outputted from the merger 214. The interface 303 outputs the data-type value 341 of that pixel to the register 331 of the select controller 304, and outputs the data-type value 342 of the left adjacent pixel to the register 332.

In the display areas 252 to 257 of FIG. 8, the left adjacent pixel of the beginning pixel in each line is the last pixel in each line in the display areas 251 to 256. Since no left adjacent pixel of the beginning pixel exists in the display area 251, an invalid value is outputted in this case. Accordingly, in any case, the result of the comparison in the comparator 333 of the select controller 304 shows no coincidence when the pixel value of the first pixel in the beginning line is written. The select control signal 343 is outputted from the select controller 304 for switching the selector 314 to the bit deletor 311 and for switching the selector 324 to the bit appender 321.

On the other hand, the pixel value 225 of the first pixel in the beginning line is inputted to the bit deletor 311 and the subtractor 312 of the compress circuit 301, and in the bit deletor 311, the lower 4 bits of each of the R value, G value, and B value of the pixel value 225 are deleted. Thus, a 12-bit compressed pixel value, whose R, G, and B values are each 4 bits, is outputted to the selector 314. The compressed pixel value is selected in the selector 314 and output as the compressed pixel value 229 to the frame buffer 202.

Further, the output compressed pixel value 229 is inputted to the bit appender 321 and the decoder 322 of the decompress circuit 302. In the bit appender 321, lower 4 bits having a value of "0" are appended in each of the R, G, and B values (each having 4 bits) which form the compressed pixel value 229.

Hence, a 24-bit pixel value whose R, G, and B values are each 8 bits, is decompressed and held in the output buffer 325 through the selector 324. The decompressed pixel value 344 of the first pixel in the beginning line which is held in the output buffer 325 is outputted to the subtractor 312 of the compress circuit 301 so as to be used for compressing the next pixel.

Then, when the pixel value write address 217 and the write signal 218 for the second pixel in the beginning line are outputted from the merger 214, the interface 303 outputs the data-type value 341 of that pixel to the register 331 of the select controller 304. Further, the data-type value 342 of the left adjacent pixel (namely, the beginning pixel) is output to the register 332. As a result, the comparison in the comparator 333 of the select controller 304 shows a coincidence, and the select control signal 343 is outputted from the select controller 304 for switching the selector 314 to the encoder 313 and for switching the selector 323 to the adder 323.

On the other hand, the pixel value 225 of the second pixel in the beginning line is inputted to the bit deletor 311 and the subtractor 312 of the compress circuit 301. In the subtractor 312, the differential value of the pixel value 225 and each of the R, G, and B values of the decompressed pixel value 344 of the beginning pixel outputted from the output buffer 325 of the decompress circuit 302, are calculated. In the encoder 313, the differential values of the respective R, G, and B values are converted to the compressed pixel value 229 according to the coding scheme shown in FIG. 12. The compressed pixel value 229 are output to the frame buffer 202 through the selector 314 via OR gate 216 shown in FIG. 7.

Further, the compressed pixel value 229 is inputted to the bit appender 321 and the decoder 322 of the decompress circuit 302. In the decoder 322, the codes of the R, G, and B values are respectively converted to 8-bit codes according to the coding scheme shown in FIG. 12. Each of the converted 8-bit codes is added to each of the R, G, and B values of the decompressed pixel value 344 of the left adjacent pixel (i.e., the beginning pixel) held in the output buffer 325. The result is held as the decompressed pixel value of the second pixel in the output buffer 325 through the selector 324.

The compression process of the pixel value by the subtractor 312 and the encoder 313 as described above continues through the last pixel in the beginning line. Following the last pixel in the beginning line, in the writing of the pixel value of the first pixel in the next line (e.g., the second line), the compression process of the pixel value by the bit deletor 311 is executed. Then, for the second and successive pixels, the compression by the subtractor 312 and the encoder 313 is executed. The process as described above continues through the last line.

The coding scheme shown in FIG. 12 is one example of coding schemes. It may have other schemes according to the designer's requirements.

Next, a first example of the configuration of the decompressor 213 in the second embodiment is described.

Referring to FIG. 13, the decompressor 213 of the first example decompresses the beginning pixel in each line of the respective display areas 251 to 257 allocated to the image sources of the first type 204-1 to 204-7 by appending lower bits having a value of "0" in each of the R, G, and B values contained in the compressed pixel value. The decompressor 213 decompresses the other pixels by the differential values corresponding to the respective codes of the R, G, and B values contained in the compressed image pixel to the R, G, and B values of the decompressed pixel value of the left adjacent pixel.

As shown in FIG. 13, the decompressor 213 has a decompress circuit 401, an interface 402, and a select controller 403. The decompress circuit 401 inputs thereto the 12-bit compressed pixel value 219 read-out from the frame buffer 202 in FIG. 7. The decompress circuit 401 outputs the pixel value 242 obtained by decompressing the pixel value 219 to 24 bits.

The interface 402 outputs a read address 222 and a read signal 223 to the data-type buffer 206 in FIG. 7, and holds the output data 224 thereof in an internal buffer (unreferenced) of the interface 402. Each time a read address 220 and a read signal 221 are outputted from the read controller 212 in FIG. 7 to the frame buffer 202, the interface 402 outputs the data-type value 441 of the pixel corresponding to the read address 220 and the data-type value 442 of the left adjacent pixel.

The select controller 403 compares the two data-type values 441 and 442 outputted from the interface 402, to output a select control signal 443 according to whether or not there is a coincidence between them. Further, the select controller determines whether or not the pixel value 441 is the data-type value "7" corresponding to the image sources 203 in FIG. 7 (an image source outputting a pixel value by an index value of the look-up table), thereby to output a select control signal 241 according to the result of the determination.

The decompress circuit 401 has a decompression process similar to the decompress circuit 302 shown in FIG. 11. That is, the decompress circuit 401 has a bit appender 421, a decoder 422, an adder 423, a selector 424, and an output buffer 425.

The bit appender 421 inputs thereto the pixel value 219 read out from the frame buffer 202, and appends lower 4 bits having a value "0" in each of the R, G, and B values (each having 4 bits) of the pixel value 219, thereby to decompress a 24-bit pixel value whose R, G, and B values are respectively 8 bits. The decoder 422 inputs thereto the pixel value 219 read out from the frame buffer 202, and decompresses the respective differential values of the R, G, and B values from the codes of the R, G, and B values of the pixel value 219. The adder 423 adds the respective differential values of the R, G, and B values decompressed by the decoder 422 to the R, G, and B values held in the output buffer 425, to decompress a 24-bit pixel value. The selector 424 selects one of the pixel value decompressed in the adder 423 and the pixel value decompressed in the bit appender 421, and outputs the selected pixel value to the output buffer 425. The code decompression scheme of the decoder 422 is the same as that shown in FIG. 12.

The select controller 403 has registers 431 and 432, and comparators 433 and 434. The registers 431 and 432 hold the two data-type values 442 and 442 outputted from the interface 402. The comparator 433 compares the two data-type values 441 and 442 held in the registers 431 and 432 to generate a select control signal 443. The comparator 434 compares the data-type value 441 with a data-type value "7" to generate a select control signal 241. The select control signal 443 is provided to the selector 424 of the decompress circuit 401. The select control signal 241 is provided to the selector 211 controlling selection of the output 242 of the decompress circuit 401 and the output of the look-up table 210.

Next, the operation of the first example of the decompressor 213 is described below with reference to FIG. 13.

The interface 402 previously reads the data-type values in the data-type buffer 206 and stores the data-type values in the internal buffer (unreferenced). When the read address 220 and the read signal 221 of the first pixel in the beginning line in the screen of the frame buffer 202 outputs from the read controller 212, the data-type value 441 of that pixel is outputted to the register 431 of the select controller 403, and the data-type value 442 of the left adjacent pixel to the register 432 is output.

Since no left adjacent pixel of the beginning pixel in each line of the display 201 exists, an invalid value is outputted as the data-type value 442. Accordingly, when the pixel value of the first pixel in the beginning line is read-out; the comparison in the comparator 433 indicates no coincidence. Thus, the selector control signal 443 is outputted from the select controller 403 for switching the selector 424 to the bit appender 421.

Further, the data-type value 441 of the beginning pixel held in the register 431 is compared with the data-type value "7" in the comparator 434. If they coincide with each other, the select control signal 241 is generated for switching the selector 211 to the look-up table 210. Otherwise, the select control signal 241 is generated for switching the selector 211 to the decompress circuit 401. Thus, if the display areas 251 to 257, and 258 are allocated to the respective image sources 204-1 to 204-7, and 203 as shown in FIG. 8, the first pixel in the beginning line in the display belongs to the display area 251 allocated to the image source 204-1, and since the value of the data-type value 441 of that pixel is "0," the selector 211 selects the decompress circuit 401. The selector 424 selects the bit appender 421.

On the other hand, the pixel value 219 of the first pixel in the beginning line read out from the frame buffer 202 is inputted to the bit appender 421 and the decoder 422. In the bit appender 421, lower 4 bits having a value of "0" are appended in each of the R, G, and B values of the pixel value 219, thereby to decompress a 24-bit pixel value whose R, G, and B values are each 8 bits, which is held in the output buffer 425 through the selector 424. The decompressed pixel value held in the output buffer 425 is sent out to the D/A converter 209 in FIG. 7 through the selector 211.

Then, when the read address 220 and the read signal 221 of the second pixel in the beginning line are outputted from the read controller 212, the interface 402 outputs the data-type value 441 of that pixel to the register 431 of the select controller 403, and outputs the data-type value 442 of the left adjacent pixel (namely the beginning pixel) to the register 432. As a result, the result of the comparison in the comparator 433 of the select controller 403 indicates a coincidence, causing the selector 424 to switch to the adder 423. From the comparator 434, the select control signal 241 is outputted for causing the selector 211 to select the decompress circuit 401.

On the other hand, the pixel value 219 of the second pixel in the beginning line read out from the frame buffer 202 is inputted to the bit appender 421 and the decoder 422 of the decompress circuit 401. In the decoder 422, the code of the R, G, and B values are respectively converted to differential codes (each having 8 bits) according to the coding scheme shown in FIG. 12. Then, each differential value is added to the decompressed pixel value of the left adjacent pixel (namely, the beginning pixel) held in the output buffer 425 for each of the R, G, and B values. The result is held in the output buffer 425 through the selector 424 as the decompressed pixel value of the second pixel, which is output to the D/A converter 209 through the selector 211.

The decompression process of the compressed pixel value by the decoder 422 and the adder 423 as described above is continued through the last pixel in the first display area 251 in the beginning line. Following the last pixel of the first display area 251 in the beginning line, the reading of the first pixel of the second display area 252 in the beginning line is performed, in which the data-type value of the left adjacent pixel is different. Thus, the decompression process of the compressed pixel value by the bit appender 421 is executed. Then, for the second and succeeding pixels in the display area 252, the decompression by the decoder 422 and the adder 423 are executed.

The above process is continued through the last pixel in the beginning line of the display, and when it is performed for the last pixel in the beginning line, or the last pixel in the beginning line of the display area 257 in FIG. 8, a process similar to that described above is repeated from the first pixel in the second line of the display. Such a process is continued through the line preceding the beginning line of the display area 258 in FIG. 8.

Then, when the read address 220 and the read signal 221 of the first pixel in the beginning line of the display area 258 are outputted from the read unit 212, the interface 402 outputs the data-type value 441 of that pixel to the register 431 of the select controller 403. The select control signal 241 is outputted from the comparator 434 for switching the selector 211 to the look-up table 210, because the value of the data-type value 441 is "7".

Accordingly, the pixel value obtained by converting the pixel value 219, which is an index value read out from the frame buffer 202, to an RGB value is output to the D/A converter 209 through the selector 211. A similar operation is repeated for all the pixels of the display area 258. When the process of the last line of the display area 258 (e.g., the last line of the display) is completed, the operation similar to that described above is again repeated from the beginning line of the display.

Next, a second example of the configuration of the decompressor 213 in the second embodiment is described.

Referring to FIG. 14, the decompressor 213 of the second example generates a decompressed pixel value by appending lower bits having a value of "0" in each of the R, G, and B values contained in the compressed pixel value for the first pixel in each line of the respective display areas 251 to 257 allocated to the first-type image sources 204-1 to 204-7. The decompressor 213 generates a decompressed pixel value made up of the following R, G, and B values for the other pixels.

R value: If the differential value between the left adjacent pixel of that pixel is equal to or greater than a predetermined value, and the differential value between the right adjacent pixel is smaller than a predetermined value, then an R value is obtained by taking an average between the R value of the right adjacent pixel; otherwise, an R value is obtained by adding the differential value corresponding to the code of the R value contained in the compressed pixel value to the R value of the decompressed pixel value of the left adjacent pixel.

G value: If the differential value between the left adjacent pixel of that pixel is equal to or greater than a predetermined value, and the differential value between the right pixel is smaller than a predetermined value, then a G value is obtained by taking an average between the G value of the right adjacent pixel; otherwise, a G value is obtained by adding the differential value corresponding to the code of the G value contained in the compressed pixel value to the G value of the decompressed pixel value of the left adjacent pixel.

B value: If the differential value between the left adjacent pixel of that pixel is equal to or greater than a predetermined value, and the differential value between the right pixel is smaller than a predetermined value, then a B value is obtained by taking an average between the right adjacent pixel; otherwise, a B value is obtained by adding the differential value corresponding to the code of the B value contained in the compressed pixel value to the B value of the decompressed pixel value of the left adjacent pixel.

Referring to FIG. 14, the decompressor 213 has a decompress circuit 501, an interface 502, and a select controller 503. The decompress circuit 501 inputs thereto the 12-bit pixel value 219 read out from the frame buffer 202 in FIG. 7, and outputs a 24-bit pixel value decompressed from the pixel value 219 with a one-cycle delay.

The interface 502 outputs a read address 222 and a read signal 223 to the data-type buffer 206 in FIG. 7, and holds the output data thereof in the internal buffer (unreferenced) of the interface 502. Each time a read address 220 and a read signal 221 are outputted from the read controller 212 to the frame buffer 202 in FIG. 7, the interface 502 outputs the data-type value 541 of the pixel corresponding to the read address 220 and the data-type value 542 of the left adjacent value.

The select controller 503 compares the two data-type values 541 and 542 outputted from the interface 502, and outputs a select control signal 543 according to whether or not they coincide with each other and determines whether or not the data-type value 541 is a data-type value "7" corresponding to the image source 203 in FIG. 7. The select controller 503 outputs the select control signal 241 according to the result of the determination with a one-cycle delay. Since the decompress circuit 501 outputs the decompressed pixel value with a one-cycle delay, a latch 600 is provided to delay the output of the look-up table 210 by one cycle for synchronization.

The decompress circuit 501 has a bit appender 521, a decoder 522, an adder 523, a selector 524, an output buffer 525, a code determiner 526, a code buffer 527, a select controller 528, an average calculator 529, and a selector 530. The output buffer 525 holds the decompressed pixel value. The bit appender 521 inputs thereto the pixel value 219 read out from the frame buffer 202, and appends lower 4 bits having a value of "0" in each of the R, G, and B values of the pixel value 219, thereby to decompress a 24-bit pixel value whose R, G, B values are each 8 bits.

The decoder 522 inputs thereto the pixel value 219 read out from the frame buffer 202, and decompresses the differential values of the respective R, G, and B values from the codes of the R, G, and B values (each having 4 bits) which form the pixel value 219.

The adder 523 decompresses a 24-bit pixel value by adding the differential values of the respective R, G, B values decompressed in the decoder 522 to the R, G, and B values forming the decompressed pixel value held in the output buffer 525. The selector 524 selects one of the pixel value decompressed in the adder 523 and the pixel value decompressed in the bit appender 521 according to the select control signal 543, and outputs the selected pixel value to the output buffer 525. These structures are similar to those in the decompress circuit 401 in FIG. 13.

The code determiner 526 determines whether or not an absolute value of each differential value of the R, G, and B values decompressed in the decoder 522 is greater than a predetermined threshold value (e.g., "128"). The code buffer 527 stores the result of the previous judgment of the code determiner 526. The average calculator 529 calculates for each of the R, G, and B values the average value between the decompressed pixel value of the current pixel obtained in the adder 523 and the decompressed pixel value of the left adjacent pixel held in the output buffer 525.

The selector 530 selects one of the R, G, and B values in the decompressed pixel value of the left adjacent pixel held in the output buffer 525 and the R, G, and B values calculated in the average calculator 529 for each of the R, G, and B values. The selected RGB value is output to the selector 211.

The select controller 528 outputs a select control signal 545 which controls the selection operation in the selector 530 according to the output of the code determiner 526 and the output of the code buffer 527. The code decompression scheme of the decoder 522 is the same as that shown in FIG. 12.

If the code determiner 526 currently indicates for the R value that the absolute value of the differential value is smaller than a threshold value, and the result of the previous determination in the code determiner 526 (which is held in the code buffer 527) indicates that the absolute value of the differential value is equal to or greater than a threshold value, then the select controller 528 generates a select control signal 545. Thus, the selector 530 selects the R value outputted by the average calculator 529. Otherwise, select controller 528 generates a select control signal 545 so that the selector 530 selects the R value which is being outputted by the output buffer 525.

Similarly, for the G value, and B value, if the result of the current determination in the code determiner 526 indicates that the absolute value of the differential value is smaller than the threshold value, and the result of the previous determination in the code determiner 526 (which is held in the code buffer 527) indicates that the absolute value of the differential value is equal to or greater than the threshold value, then the select controller 528 generates a select control signal 545 so as to select the output of the average calculator 529. Otherwise, the select controller 528 generates a select control signal 545 so as to select the output of the output buffer 525.

The select controller 503 has registers 531 and 532, comparators 533 and 534, and a delay circuit 535. The registers 531 and 532 hold the two data-type values 541 and 542 outputted from the interface 502. The comparator 533 compares the two data-type values 541 and 542 held in the registers 531 and 532 to generate the select control signal 543. The comparator 534 compares the data-type value 541 with the data-type value "7" to generate the select control signal 241.

The delay circuit 535 outputs the select control signal 241 generated in the comparator 534 after delaying it by one timing cycle. The select control signal 543 is provided to the selector 524 of the decompress circuit 501 and the code determiner 526. The select control signal 241 is provided to the selector 211 which selects one of the output of the decompress circuit 501 and the output of the look-up table 210. The code determiner 526 unconditionally outputs a determination result that the absolute value of the differential value is smaller than the threshold value, if the select control signal 543 indicates the selection of the bit appender 521.

The operation of the second example of the decompressor 213 in the second embodiment of the color image display apparatus is described below with reference to FIG. 14.

The interface 502 previously reads the data-type values in the data-type buffer 206 and stores them in the internal buffer (unreferenced) of the interface 502. When the read address 220 and the read signal 221 of the first pixel in the beginning line in the screen of the frame buffer 202 are outputted from the read controller 212, the data-type value 541 is outputted to the register 531 of the select controller 503, and the data-type value 542 of the left adjacent pixel is outputted to the register 532. Since no left adjacent pixel of the first pixel in each line of the display exists, an invalid value is outputted as the data-type value 542.

Accordingly, when the pixel value of the first pixel in the beginning line is read, the result of the comparison in the comparator 533 of the select controller 503 indicates no coincidence. Then, the select control signal 543 is outputted from the select controller 503 for switching the selector 524 to the bit appender 521. The select control signal 543 causes the code determiner 526 to unconditionally output a determination result that the absolute value of the differential value is smaller than the threshold value.

Further, the data-type value 541 of the first pixel held in the register 531 is compared with the data-type value "7" (indicating image sources 204-1 to 204-7) in the comparator 534. If they coincide with each other, then the select control signal 241 is generated one cycle later for switching the selector 211 to the look-up table 210. Otherwise, the select control signal 241 is generated for switching the selector 211 to the decompress circuit 501.

Accordingly, if the display areas 251 to 257, and 258 are allocated to the respective image sources 204-1 to 204-7, and 203 as shown in FIG. 8, the first pixel in the beginning line in the display belongs to the display area 251 allocated to the image source 204-1 and the data-type value 541 of that pixel is "0". Thus, the selector 524 selects the bit appender 521 and the selector 211 selects the decompress circuit 501 one cycle later.

On the other hand, the pixel value 219 of the first pixel in the beginning line read out from the frame buffer 202 is inputted to the bit appender 521 and the decoder 522 of the decompress circuit 501. In the bit appender 521, lower 4 bits having a value of "0" are appended in the respective R, G, and B values of the compressed pixel value 219, thereby to decompress the compressed pixel value 219 to a 24-bit pixel value (having R, G, and B values which are each 8 bits), which is held in the output buffer 525 through the selector 524, but is not yet sent out to the D/A converter 209 in FIG. 7.

Then, when the read address 220 and the read signal 221 of the second pixel in the beginning line are outputted from the read controller 212, the interface 502 outputs the data-type value 541 of that pixel to the register 531 of the select controller 503. The interface 502 also outputs the data-type value 542 of the left adjacent pixel (namely, the beginning pixel) to the register 532. As a result, the comparator 533 of the select controller 503 indicates a coincidence, and causes the selector 524 to select the adder 523. Further, the comparator 534 outputs the select control signal 241 one cycle later for switching the selector 211 to the decompress circuit 501.

On the other hand, the pixel value 219 of the second pixel in the beginning line read out from the frame buffer 202 is inputted to the bit appender 521 and the decoder 522 of the decompress circuit 501, and in the decoder 522, the codes of the R, G, and the B values are respectively converted to differential values according to the coding scheme shown in FIG. 12.

Then, in the adder 523, the converted differential values are added for each of the R, G, and B values to the decompressed value of the left adjacent value (namely, the beginning pixel) held in the output buffer 525 to decompress a pixel value. The decompressed pixel value is outputted to the average calculator 529 and also is outputted to the selector 524 at a later predetermined timing (e.g., the same timing as the output timing of the average calculator).

The average calculator 529 calculates the average for each of the R, G, and B values the average between the inputted decompressed pixel value and the decompressed pixel value of the left adjacent pixel (namely, the beginning pixel) held in the output buffer 525, and outputs it to the selector 530.

Further, in the code determiner 526, it is determined whether the differential value of the current pixel is larger or smaller than the threshold value, and outputs the result to the select control unit 528. At this point, the result of the previous determination in the code determiner 526 (the determination result of the absolute value of the differential value being smaller than the threshold value) is stored in the code buffer 527.

Thereafter, the select controller 528 generates the select control signal 545 according to the current determination result of the code determiner 526 and the previous determination result held in the code buffer 527. Since, in this case, the code buffer 527 holds the determination result of the absolute value of the differential value being smaller than the threshold value, the select controller 528 generates the select control signal 545 so as to select the output buffer 525 for any of the R, G, and B values. By this, the decompressed pixel value of the beginning pixel held in the output buffer 525 is outputted to the selector 211 through the selector 530, and it is selected by the select control signal 241 outputted one cycle later and outputted to the D/A converter 209.

That is, the decompressed pixel value of the beginning pixel is outputted to the D/A converter 209 at the time when the reading and processing of the second pixel is terminated. In addition, the decompressed pixel value of the current pixel (e.g., the second pixel) outputted from the adder 523 to the selector 524 is stored in the output buffer 525 through the selector 524 at a timing after the decompressed pixel value of the beginning pixel is outputted from the output buffer 525.

Then, when the read address 220 and the read signal 221 of the third pixel in the beginning (e.g., first) line are outputted from the read controller 212, the interface 502 outputs the data-type value 541 of that pixel to the register 531 of the select controller 503. The interface 502 also outputs the data-type value 542 of the left adjacent pixel (namely, the second pixel) to the register 532. As a result, the comparator 533 of the select controller 503 indicates a coincidence to switch the selector 524 to the adder 523. Further, the comparator 534 outputs the select control signal 241 one cycle later for switching the selector 211 to the decompress circuit 501.

On the other hand, the compressed pixel value 219 of the third pixel in the first line read out from the frame buffer 202 is converted, in the decoder 522 of the decompress circuit 501, to differential values in which the codes of the R, G, and B values are each 8 bits, according to the coding scheme shown in FIG. 12. Then, the adder 523 adds them to the decompressed pixel value of the left adjacent pixel (namely, the second pixel) held in the output buffer 525 for each of the R, G, and B values to decompress a pixel value, which is outputted to the average calculator 529 and then to the selector 530.

The average calculator 529 calculates the average value, for each of the R, G, and B values, between the inputted decompressed pixel value and the decompressed pixel value of the left adjacent pixel (namely, the second pixel) held in the output buffer 525, and outputs it to the selector 530.

Further, in the code determiner 526, it is determined whether the differential value of the current pixel obtained in the decoder 522 is greater or smaller than the threshold value, and the result is outputted to the select controller 528. At this point, the previous determination result of the code determiner 526 (the determination result of the differential value of the second pixel) is stored in the code buffer 527. Thereafter, the select controller 528 generates the select control signal 545 according to the current determination result and the previous determination result held in the code buffer 527.

For example, for the R value, if the current determination result of the code determiner 526 indicates that the absolute value of the differential value is smaller than the threshold value, and the previous determination result of the code determiner 526 (e.g., held in the code buffer 527) indicates that the absolute value of the differential value is equal to or greater than the threshold value, then the select controller 528 generates the select control signal 545. Hence, the selector 530 selects the output of the average calculator 529 for the R value. Otherwise, the select controller 528 generates the select control signal 545 so that the R value which is being outputted by the output buffer 525 is used.

Similarly, for the G value and B value, if the current determination result of the code determiner 526 indicates that the absolute value of the differential value is smaller than the threshold value, and the previous determination result of the code determiner 526 which is held in the code buffer 527 indicates that the absolute value of the differential value is equal to or greater than the threshold value, then the select controller 528 generates the select control signal 545 so as to select the output of the average calculator 529. Otherwise, it generates the select control signal 545 so as to select the output of the output buffer 525. By the select control signal 545, one of the decompressed pixel value of the second pixel held in the output buffer 525 and the average value between the pixel values of the second and third pixels calculated in the average calculator 529 is selected in the selector 530 on the basis of the R, G, and B values and outputted to the selector 211, and it is selected in the selector 211 by the select control signal 241 outputted one cycle later, and outputted to the D/A converter 209. That is, the decompressed pixel value of the second pixel is outputted to the D/A converter 209 at the time when the reading and processing of the third pixel are ended.

The decompression process of the compressed pixel value by the decoder 522, the adder 523, the average calculator 529 and the like as described above continues through the last pixel of the first display area 251 in the first line. Following the last pixel of the first display area 251 in the first line, when the first pixel of the second display area 252 in the first line is read, the data-type value of the left adjacent pixel is different. Thus, the decompression process of the compressed pixel value by the bits appender 521 again is executed, and then for the second and succeeding pixels in the display area 252, the decompression by the decoder 522, the adder 523 and the like is executed.

The above process continues through the last pixel in the first line of the display, and when the last pixel in the first line, or the last pixel in the beginning line of the display area 257 in FIG. 8, is reached, a process similar to that described above is repeated from the first pixel in the second line of the display. Such a process continues through the line preceding the beginning line of the display area 258 in FIG. 8.

Then, when the read address 220 and the read signal 221 of the first pixel in the first line of the display area 258 in FIG. 8, are outputted from the read controller 212, the interface 502 outputs the pixel value 541 of that pixel to the register 531 of the select controller 503. The comparator 534 outputs the select control signal 241 for switching the selector 211 to the look-up table 210 one cycle later, because the value of the data-type value 541 is "7".

Accordingly, the pixel value 219, an index value outputted from the frame buffer 202, becomes a pixel value converted to an RGB value in the look-up table 210. The converted pixel value is output to the D/A converter 209 through the selector 211 after being delayed by one cycle in the latch 600. A similar operation is repeated for all the pixels in the display area 258. When the processing of the last line of the display area 258, or the last line of the display, is completed, an operation similar to that described above is repeated again from the first line of the display.

Next, exemplary pixel values provided by the first and second example of the decompressor 213 are described. For convenience and brevity, only the R values are described as one example. However, B and G values would be similarly processed and produced.

Referring to FIG. 15A, if continuous pixels G1 to G7, on the same line, having R values of "18", "19", "23", "25", "93", "95", and "97", respectively, are compressed in the compressor 215 in FIG. 11, then the compressed pixel values are as shown in FIG. 15B.

In FIG. 15B, a first compressed pixel value "1" shows a value obtained by deleting the lower 4 bits of the pixel value "18", and the second and succeeding compressed pixel values "1", "2", "0", "6", "12", and "8" respectively show the codes shown in FIG. 12. The compressed pixel values are stored in the frame buffer 202.

FIG. 15C shows the decompressed pixel values of the respective pixels which are provided when the compressed pixel values shown in FIG. 15B are decompressed in the decompressor 213 in FIG. 13. As shown in FIG. 15C, the decompression is performed with high-precision for the pixels G1, G2, G3, G4, G6, and G7 which have a small differential value between the left adjacent pixel value, respectively. This is because more codes are allocated when the differential value is smaller. However, for the pixel G5 whose differential value between the left adjacent pixel value is relatively larger, the decompressed pixel value is "122", whereas the actual value is "93", showing a significant difference.

On the other hand, FIG. 15D shows the decompressed pixel value of the respective pixels when the compressed pixel values shown in FIG. 15B are decompressed by the decompressor 213 in FIG. 14. As shown in FIG. 15D, the decompression is performed with high-precision for the pixels G1, G2, G3, G4, G6 and G7 which have a smaller differential value between the left adjacent pixel value. However, for the pixel G5 which has a larger differential value between the left adjacent pixel value, the decompressed value is "110" while the actual value is "93". This shows that the decompression precision is increased as compared with "122" by the decompressor 213 in FIG. 13. Generally, pixels having a larger differential values between the left adjacent pixel value appear in the edge portion of an image, and thus the decompressor 213 of FIG. 14 decompresses the edge portion with higher-precision.

Although the number of the image sources of the first type was "7" in the embodiment in FIG. 7, it may be any number equal to "1" or larger. Further, in the above embodiments, an RGB value was assumed to be 24 bits and an index value of the look-up table was assumed to be 12 bits, but it is to be understood that they are not limited to those numbers of bits. Moreover, the allocation of the display areas to the image sources 204-1 to 204-7, and 203 is not limited to the example in FIG. 8, but the allocation may be performed as shown in FIG. 16.

Further, in the embodiment in FIG. 7, it was assumed that the image sources of the first type 204-1 to 204-7 specify a pixel value by an RGB value. However, the present invention can also be applied in a system in which a pixel value is specified by a YUV value rather than an RGB value. In this case, in the compressor 215 in FIG. 7, the YUV value is compressed and stored in the frame buffer 202 as is the RGB value, and in the decompressor 213 of the buffer reader 108, the YUV is decompressed as is the RGB value.

Referring to FIG. 17, a YUV-RGB convertor 299 is added between the decompressor 213 and the selector 211. The YUV-RGB converter 299 converts the YUV value decompressed in the decompressor 213 to an RGB value.

One example of the YUV-RGB conversion is:

$R=1.164\times(Y-16)+1.596\times(V-128)$;

$G=1.164\times(Y-16)-0.813\times(V-128)-0.391\times(U-128)$;

and $B=1.164\times(Y-16)+2.018\times(U-128)$.

As is apparent from the above description, according to the present invention, a buffer reader is provided for determining the format of the pixel value according to the contents of the data-type buffer when the pixel value is read out from the frame buffer. If the pixel value is an RGB value, then it is directly outputted, whereas if it is an index value, then the index value is converted to an RGB value in the look-up table before outputting. Thus, two types of image data (e.g., image data for which a pixel value is specified by an index value of the look-up table, and image data for which a pixel value is specified by an RGB value) can be displayed by using a single frame buffer.

In the configuration in which an RGB value is compressed when stored in the frame buffer and is decompressed when read out from the frame buffer, the capacity of the frame buffer which is required for each pixel can be decreased from a fixed maximum capacity to a capacity required to hold an index value.

While the invention has been described in terms of several preferred embodiments, those skilled in the art will recognize that the invention can be practiced with modification within the spirit and scope of the appended claims.

What is claimed is:

1. A color image display apparatus, comprising:

a display, having pixels, for displaying color images on said pixels;

a first image source for outputting a first pixel value for said display;

a look-up table for storing a second pixel value for said display;

a second image source for outputting an index value to index said look-up table;

a frame buffer for storing both said first pixel value and said index value corresponding to each of said pixels on said display;

a data-type buffer for storing a data-type indicating whether each value stored in said frame buffer comprises said first pixel value or said index value, for each of said pixels on said display;

a buffer writer for writing one of said first pixel value from said first image source and said index value from said second image source to said frame buffer, for each of said pixels of said display; and a buffer reader for reading a value stored in said frame buffer for each pixel of said pixels, and outputting one of said first pixel value stored in said frame buffer and said second pixel value stored in said look-up table according to said data-type of said each pixel in said data-type buffer, and wherein said first pixel value and said second pixel value comprise brightness and first and second color differentials (YUV) values.

2. A color image display apparatus, comprising:

a display, having pixels, for displaying color images on said pixels;

a first image source for outputting a first pixel value for said display;

a look-up table for storing a second pixel value for said display;

a second image source for outputting an index value to index said look-up table;

a frame buffer for storing both said first pixel value and said index value corresponding to each of said pixels on said display;

a data-type buffer for storing a data-type indicating whether each value stored in said frame buffer comprises said first pixel value or said index value, for each of said pixels on said display;

a buffer writer for writing one of said first pixel value from said first image source and said index value from said second image source to said frame buffer, for each of said pixels of said display; and a buffer reader for reading a value stored in said frame buffer for each pixel of said pixels, and outputting one of said first pixel value stored in said frame buffer and said second pixel value stored in said look-up table according to said data-type of said each pixel in said data-type buffer, wherein said buffer writer comprises a compressor, coupled to said first image source and said frame buffer, for compressing said first pixel value, and wherein said buffer reader comprises a decompressor, coupled to said frame buffer, for decompressing said first pixel value from said frame buffer, wherein said first pixel value and said second pixel value comprise RGB values each having an R value, and G value, and a B value, wherein, if the pixel comprises a first pixel in each line of each display area, said compressor compresses said first pixel value by deleting lower bits of each of the R value, the G value, and the B value, and wherein, if the pixel does not comprise the first pixel in each line of each display area, said compressor compresses said first pixel value by encoding a differential value between the R value, the G value, and the B value of said first pixel value and the R value, the G value, and the B value of an adjacent pixel by a coding scheme, and wherein a range of the differential value is segmented more finely as its absolute value becomes smaller and a code is allocated to each segment of the differential value.

3. The color image display apparatus according to claim 2, wherein said compressor comprises:

a compress circuit for compressing said first pixel value, a decompress circuit for decompressing said first pixel value, and a select controller for controlling said compress circuit and said decompress circuit, said compress circuit comprising:

a bit deletor for deleting lower bits of each of the R value, the G value, and the B value of said first pixel value;

a subtractor for calculating the differential value between the R value, the G value, and the B value of said first pixel value and the R value, the G value, and the B value, respectively, of the adjacent pixel;

an encoder for encoding the differential value calculated in said subtractor; and a first selector for selecting one of an output of said encoder and an output of said bit deletor according to said select controller, said decompress circuit comprising:

an output buffer for storing the R value, the G value, and the B value of the adjacent pixel;

a bit appender for appending lower bits of each of the R value, the G value, and the B value of the compressed first pixel value compressed by said compress circuit;

a decoder for decompressing the differential value from the compressed first pixel value compressed by said compress circuit;

an adder for adding the differential values of the respective R value, G value, B value decompressed in said decoder and the R value, the G value, and the B value of the adjacent pixel stored in said output buffer; and a second selector for selecting one of an output of said adder and an output of said bit appender according to said select controller.

4. The color image display apparatus according to claim 3, wherein, if the pixel comprises the first pixel in each line of each display area, said decompressor decompresses said first pixel value by appending lower bits of each of the R value, the G value, and the B value of the compressed first pixel value compressed by said compress circuit, and wherein, if the pixel does not comprise the first pixel in each line of each display area, said decompressor decompresses said first pixel value by adding the differential values of the respective R value, G value, and B value decompressed in said decoder and the R value, the G value, and the B value, respectively, of the adjacent pixel stored in said output buffer.

5. The color image display apparatus according to claim 4, wherein said decompressor comprises a second decompress circuit for decompressing said first pixel value from the compressed first pixel value stored in said frame buffer, and a second select controller for controlling said decompress circuit, said second decompress circuit comprising:

a second output buffer for storing the R value, the G value, and the B value of the adjacent pixel;

a second bit appender for appending lower bits of each of the R value, the G value, and the B value of the compressed first pixel value stored in said frame buffer;

a second decoder for decompressing the differential value from the compressed first pixel value stored in said frame buffer;

a second adder for adding the differential values of the respective R value, G value, and B value decompressed in said second decoder and the R value, the G value, and the B value of the adjacent pixel stored in said second output buffer; and a second selector for selecting one of an output of said second adder and an output of said second bit appender according to said second select controller.

6. The color image display apparatus according to claim 4, wherein said decompressor comprises a second decompress circuit for decompressing said first pixel value from the compressed first pixel value stored in said frame buffer, and a second select controller for controlling said decompress circuit, said second decompress circuit comprising:

a second output buffer for storing the R value, the G value, and the B value of the adjacent pixel;

a second bit appender for appending lower bits of each of the R value, the G value, and the B value of the compressed first pixel value stored in said frame buffer;

a second decoder for decompressing the differential value from the compressed first pixel value stored in said frame buffer;

a second adder for adding the differential values of the respective R value, G value, and B value decompressed in said second decoder and the R value, the G value, and the B value of the adjacent pixel stored in said second output buffer;

a second selector for selecting one of an output of said second adder and an output of said second bit appender according to said second select controller;

an average calculator for calculating an average value, for each of the R value, G value, and B value, between the output of said second adder and an output of said second output buffer;

a code determiner for determining a larger of the differential values of the R value, G value, and B value decompressed by said second decoder and a predetermined value;

a code buffer for storing a result of a previous determination in said code determiner; and a third selector for selecting the R value, G value, and B value stored in said second output buffer for those of the R values, G values, and B values for which it is indicated that the previous determination result stored in said code buffer is no less than a predetermined value and a current determination result by said code determiner is smaller than the predetermined value, and for selecting the R value, G value, and B value which were stored in said second output buffer for the other R values, G values, and B values.

7. The color image display apparatus according to claim 2, wherein, if the pixel comprises the first pixel in each line of each display area, said decompressor decompresses said first pixel value by appending lower bits of each of the R value, the G value, and the B value of the compress first pixel value compressed by said compressed circuit, and wherein, if the pixel does not comprise the first pixel in each line of each display area, the decompressor decompresses said first pixel value by adding the differential values of the respective R value, G value, and B value decompressed in said decoder and the R value, the G value, and the B value of the adjacent pixel stored in said output buffer.

8. The color image display apparatus according to claim 7, wherein said decompressor comprises a decompress circuit for decompressing said first pixel value from the compressed first pixel value stored in said frame buffer, and a select controller for controlling said decompress circuit, said decompress circuit comprising:

an output buffer for storing the R value, the G value, and the B value of the adjacent pixel;

a bit appender for appending lower bits of each of the R value, the G value, and the B value of the compressed first pixel value stored in said frame buffer;

a decoder for decompressing the differential value from the compressed first pixel value stored in said frame buffer;

an adder for adding the differential values of the respective R value, G value, and B value decompressed in said decoder and the R value, the G value, and the B value of the adjacent pixel stored in said output buffer; and a selector for selecting one of an output of said adder and an output of said bit appender according to said select controller.

9. The color image display apparatus according to claim 7, wherein said decompressor comprises a decompress circuit for decompressing said first pixel value from the compressed first pixel value stored in said frame buffer, and a select controller for controlling said decompress circuit, said decompress circuit comprising:

an output buffer for storing the R value, the G value, and the B value of the adjacent pixel;

a bit appender for appending lower bits of each of the R value, the G value, and the B value of the compressed first pixel value stored in said frame buffer;

a decoder for decompressing the differential value from the compressed first pixel value stored in said frame buffer;

an adder for adding the differential values of the respective R value, G value, and B value decompressed in said decoder and the R value, the G value, and the B value of the adjacent pixel stored in said output buffer;

a first selector for selecting one of an output of said adder and an output of said bit appender according to said select controller;

an average calculator for calculating an average value, for each of the R value, G value, and B value, between the output of said adder and an output of said output buffer;

a code determiner for determining a larger of the differential values of the R value, G value, and B value decompressed by said decoder and a predetermined value;

a code buffer for storing a result of a previous determination in said code determiner; and a second selector for selecting the R value, G value, and B value stored in said output buffer for those of the R values, G values, and B values for which it is indicated that the previous determination result stored in said code buffer is no less than a predetermined value and a current determination result by said code determiner is smaller than the predetermined value, and for selecting the R value, G value, and B value which were stored in said output buffer for the other R values, G values, and B values.

10. A color image display apparatus, comprising:

a display, having pixels, for displaying color images on said pixels;

a first image source for outputting a first pixel value for said display;

a look-up table for storing a second pixel value for said display;

a second image source for outputting an index value to index said look-up table;

a frame buffer for storing both said first pixel value and said index value corresponding to each of said pixels on said display;

a data-type buffer for storing a data-type indicating whether each value stored in said frame buffer comprises said first pixel value or said index value, for each of said pixels on said display;

a buffer writer for writing one of said first pixel value from said first image source and said index value from said second image source to said frame buffer, for each of said pixels of said display; and a buffer reader for reading a value stored in said frame buffer for each pixel of said pixels, and outputting one of said first pixel value stored in said frame buffer and said second pixel value stored in said look-up table according to said data-type of said each pixel in said data-type buffer, wherein said buffer writer comprises a compressor, coupled to said first image source and said frame buffer, for compressing said first pixel value, and wherein said buffer reader comprises a decompressor, coupled to said frame buffer, for decompressing said first pixel value from said frame buffer, and wherein said first pixel value and said second pixel value comprise brightness and first and second color differentials (YUV) values.

* * * * *